United States Patent [19]

Goldhagen et al.

[11] Patent Number: 5,633,916

[45] Date of Patent: May 27, 1997

[54] UNIVERSAL MESSAGING SERVICE USING SINGLE VOICE GRADE TELEPHONE LINE WITHIN A CLIENT/SERVER ARCHITECTURE

[75] Inventors: Bruce Goldhagen, Newtown Square; Frederick C. Kruesi, Exton; Gary P. Russell, King of Prussia; John Homan, Ephrata; Edwin M. Elrod, Downingtown, all of Pa.

[73] Assignee: Unisys Corporation, Blue Bell, Pa.

[21] Appl. No.: 367,973

[22] Filed: Dec. 30, 1994

[51] Int. Cl.⁶ .................................................. H04M 1/64
[52] U.S. Cl. ............................. 379/67; 379/88; 379/89; 379/96
[58] Field of Search ...................... 379/67, 88, 89, 379/90, 93, 94, 96, 201, 243, 244, 245, 246

[56] References Cited

U.S. PATENT DOCUMENTS

| | | | |
|---|---|---|---|
| 4,612,416 | 9/1986 | Emerson et al. | 379/67 |
| 4,837,798 | 6/1989 | Cohen et al. | 379/88 |
| 5,003,577 | 3/1991 | Ertz et al. | 379/89 |
| 5,060,135 | 10/1991 | Levine et al. | 364/200 |
| 5,133,004 | 7/1992 | Heileman, Jr. et al. | 379/67 |
| 5,164,982 | 11/1992 | Davis | 379/96 |
| 5,187,735 | 2/1993 | Herrero Garcia et al. | 379/88 |
| 5,193,110 | 3/1993 | Jones et al. | 379/94 |
| 5,259,024 | 11/1993 | Morley, Jr. et al. | 379/88 |
| 5,265,033 | 11/1993 | Vajk et al. | 364/514 |
| 5,293,250 | 3/1994 | Okumura et al. | 358/402 |
| 5,323,450 | 6/1994 | Goldhagen et al. | 379/100 |
| 5,327,486 | 7/1994 | Wolff et al. | 379/96 |
| 5,329,583 | 7/1994 | Jurgensen et al. | 379/266 |
| 5,333,266 | 7/1994 | Boaz et al. | 395/200 |
| 5,406,557 | 4/1995 | Baudoin | 379/94 X |
| 5,452,289 | 9/1995 | Sharma et al. | 379/93 X |
| 5,467,390 | 11/1995 | Brankley et al. | 379/93 X |
| 5,473,680 | 12/1995 | Porter | 379/201 |
| 5,479,411 | 12/1995 | Klein | 379/88 X |
| 5,497,373 | 3/1996 | Hulen et al. | 379/89 X |
| 5,524,137 | 6/1996 | Rhee | 379/67 |
| 5,530,740 | 6/1996 | Irribarren et al. | 379/89 |
| 5,557,659 | 9/1996 | Hyde-Thomson | 379/88 |

OTHER PUBLICATIONS

Karve, Anita, "Operator, Give Me Telephony" LAN Magazine, Jul., 1994, pp. 71–77.

Luhmann, Rick, "Unified Messaging", Computer Telephony, Jul./Aug. 1994, pp. 48–58.

Paul, Pamela M., "Solving the Client/Server Puzzle", Datapro Computer Systems Analyst, Dec. 1993.

Paul, Pamela M. et al., "Client/Server Middleware: Solutions For Integration", Datapro Computer Systems Analyst, Jun. 1994.

*Primary Examiner*—Krista M. Zele
*Assistant Examiner*—Scott L. Weaver
*Attorney, Agent, or Firm*—John B. Sowell; Mark T. Starr; John F. O'Rourke

[57] ABSTRACT

An integrated voice and data messaging system is disclosed. The system includes a Server comprising a first computer, a network applications platform (NAP) running on the first computer, and means for storing voice and data messages. In addition, the system includes a Client comprising a second computer with an associated display and means for transmitting analog voice messages and digital data messages to the Server, a Client/Server interface coupling the Client to the Server and providing a medium over which the Client and Server communicate; and a Universal Mailbox Application running on the Server, the Client, or both the Server and Client. The system is capable of visually indicating to a user, via the display device associated with the Client computer, that a message has been delivered for the user and is being held by the Server, wherein the message may be a voice, data or facsimile message. The system is particularly suited for exchanging messages among Small Office/Home Office (SOHO) users having access to one or more database services, including a voice-mail service. The SOHO users are typically not attached to a local area network (LAN) and gain access to a Server of the messaging system through a public switched telephone network (PSTN), a telephone and a personal computer (PC).

16 Claims, 14 Drawing Sheets

UNIVERSAL MESSAGING SERVICE USING SINGLE VOICE GRADE TELEPHONE LINE WITHIN A CLIENT/SERVER ARCHITECTURE

FIELD OF THE INVENTION

The present invention relates generally to messaging systems, e.g., a voice-mail system and a user interface therefor. More particularly, the present invention relates to a Client/Server messaging system providing integrated voice, data and facsimile (image) messaging services. The description of preferred embodiments of the invention refers to PC-based clients. However, the invention may be practiced with any screen-based client platform, such as a Macintosh or Unix-based computer.

BACKGROUND OF THE INVENTION

1. COMPUTER/TELEPHONY MESSAGING SYSTEMS

Voice-mail service systems permit a calling party to send a voice message to a called party without the assistance of another person. The called party is permitted to retrieve messages at will via his or her telephone without the assistance of another person. Conventional voice-mail service systems provide only audio access to the voice messages. That is, the messages can only be retrieved or created via a telephone, which means that a user must scroll sequentially through his or her message headers in voice mode by listening to the header information. This disadvantage is purportedly addressed by U.S. Pat. No. 5,003,577, Mar. 26, 1991, titled "Voice and Data Interface to a Voice-Mail Service System," which discloses a user access interface to a voice messaging (voice-mail) system. The disclosed system includes a voice channel and a data channel, the latter permitting the user to interact with the voice-mail service system via a video terminal or display-equipped computer and to print message headers on the terminal or display. The user can visually scan the headers and then listen to the messages or record new messages via the voice channel. An interface between the terminal and voice message system is provided by a "function" executing on the terminal. A data terminal interface "function" is executed on the voice-message service system. Users and their respective terminals are described as being interconnected by a private branch exchange (PBX) switching system. In addition, according to the patent, voice terminals are connected to the PBX by voice channels while data terminals are connected to the PBX by data channels. The patent states that the voice and data channels can be carried by separate physical links or a common link. For example, where the voice terminal is a standard telephone and the data terminal is a stand-alone PC, the voice and data channels could be carried, respectively, by a conventional telephone loop and a separate data link supporting the ISDN xB+D protocol. However, where the voice terminal is a digital telephone and the data terminal is a PC coupled to the digital telephone set, both the voice and data channels could be carried by a single link supporting the ISDN protocol.

One shortcoming of the system disclosed in U.S. Pat. No. 5,003,577 is that, if the user does not have a digital telephone, he or she must employ two separate communications links to concurrently access analog voice and digital data messages. Moreover, this system is believed to be inefficient in its use of "dumb" terminals; the complexity required to synchronize separate voice and data paths; and the cost associated with the additional port needed to provide voice and data paths. Furthermore, ISDN is not presently in general use, and so the system disclosed is limited to the extent it relies on ISDN.

2. THE UNISYS NETWORK APPLICATIONS PLATFORM

U.S. Pat. No. 5,133,004, Jul. 21, 1992, titles "Digital Computer Platform for Supporting Telephone Network Applications," discloses a "Network Applications Platform" (NAP) that is employed in a preferred embodiment of the present invention. The disclosure of this patent represents part of the background of the present invention, and thus is summarized below. The reader should review the patent itself for a complete description of the NAP. U.S. Pat. No. 5,323,450, dated Jun. 21, 1994, should also be reviewed for background.

The variety of telephone services currently available include call answer, call forward, voice store and forward, voice-mail, emergency number facilities, directory assistance, operator assistance, call screening, and automatic wake-up services. Such services had generally been provided by dedicated systems specifically designed for the service and the hardware environment in which the system was to be deployed, which made the systems inflexible and expensive. Following divestiture, the Bell Operating Companies (BOCs) and Independent Telephone Companies (Telcos), in devising ways to increase the return on their installed telephone networks, began to offer new services that integrated into, or interfaced with, the existing network, resulting in greater utilization of the network. The invention disclosed in U.S. Pat. No. 5,133,004 made it easier for the BOCs and Telcos to provide new services by removing the dependence on the telephone switch provider in implementing these new services. In particular, the Network Applications Platform, or NAP, was designed to interface with the telephone network and support application software deployed by the BOCs and Telcos to provide services they wanted to offer.

The NAP is a digital computer that interfaces with the network and is programmed with software providing the telephone network functionality required to support the new service-related applications. Such functionality includes detecting and reporting an incoming call from the network, initiating an outgoing call to the network, receiving a voice message from the network, sending a voice message to the network, collecting digits entered from the network, switching calls between channels, terminating calls, and detecting and reporting call termination.

The NAP includes a database including a voice file for storing predetermined digitized voice and tone messages to be applied to the network and voice messages received from the network to be re-applied thereto. The NAP is implemented on an A Series digital computer system commercially available from Unisys Corporation, Blue Bell, Pennsylvania, the assignee of the present invention. The NAP uses the standard parallel I/O processing capabilities, the Data Management System II (DMSII) and disk storage facilities and Direct I/O, as well as the communications capabilities such as Communication Management System (COMS) and Data Communications (DATACOM) of the A Series system. The applications communicate with the NAP through message-passing communication apparatus, such as the A Series COMS. The applications comprise a plurality of independent applications deployed by the telephone company to provide the desired services to the users.

The NAP includes three software modules collectively referred to as a Voice Network Management System (VNMS). The VNMS comprises an Application Interface Module (AIM), a Voice Message Management Module (VMMM), and a Network Interface Unit Manager (NIUM). The VNMS resides in main memory of the computer system on which the NAP is installed, i.e., the A Series system. The applications communicate with the AIM through the COMS via multiple dialogs, each representing a logically distinct sequence of related messages. The messages within each dialog occur in pairs, with each pair comprising an AIM Command from an application requesting the NAP to perform a function and a response from the AIM to the application with appropriate status information or data, such as keyed-in caller digits or message number identification Tokens.

The AIM is the point of communication between the NAP and the applications and directs the functionality of the NAP. Under the direction of the AIM, the VMMM controls sending and receiving digital voice messages between the NAP and the network. The AIM also communicates with the NIUM to receive digits from the network, such as DTMF digits; to receive status signals from the network; and to control call switching at the interface between the NAP and the network.

The NAP interfaces with the network through one or more Network Interface Units (NIUs). Each NIU comprises a computer-controlled, digital matrix switch that communicates with the lines and trunks of the network. The NIUs communicate with the voice message portion of the NAP via ports over a communication link comprising a conventional T1 digital voice link or trunk.

The NIUs communicate with the NIUM via communication apparatus, such as the A Series DATACOM. The communication links through the DATACOM from the NIUM to the NIUs control switching of ports so that any port can be connected to any other port. The NIUs include DTMF receivers that may be selectively connected to the ports of incoming calls under control of the NIUM to provide entered DTMF digits to the NIUM.

The VMMM controls sending and receiving digital voice messages to and from the network. The messages are stored on a disk. The VMMM communicates with the disk through an I/O processor system including an A Series I/O interface such as DMSII and Direct I/O. The I/O processor system communicates with the T1 digital voice link via an interface composed of one or more Voice Interface Modules (VIMs). The VMMM communicates with the VIMs via the I/O processor system which includes the standard A Series MLI (SDS 2323 7399) communication subsystem for effecting data transfers. Each of the VIMs is associated with a plurality of voice channels currently established by the system.

Predetermined voice messages, such as service offering prompts and instructions to callers, are stored on disk. These messages are accessed by the applications via the VMMM and transmitted over a voice channel through selected ports in the NIU. Voice messages from callers are stored on disk for re-transmission to the network under control of appropriate applications. The NIUM selects and connects the ports of the NIU under command of the applications and the VMMM controls the flow of the digital voice messages.

Central Office (CO) switches include the capability of detecting a predetermined number of ring-back or busy tones with respect to an incoming call and switching the incoming line to an outgoing line predetermined by the telephone company. Thus, for applications such as Call Answer, the CO can switch the call to a telephone number in the address space of the CO, for routing the call to the NAP so that the appropriate application can provide the service. Other services such as voice-mail and voice-store and forward use appropriate access telephone numbers in the address space of the CO to connect to the desired service. Based on configurable translation of information, such as the incoming port address and telephone number or other information transmitted to the NAP by the CO, the NIUM determines the appropriate application to utilize.

3. PROBLEMS WITH THE PRIOR ART

Unisys Corporation's Network Applications Platform, along with its suite of robust applications, can currently support subscribers using standard DTMF capable telephones and Group III capable facsimile machines connected to a Server through a public switched telephone network (PSTN). There is another group of Small Office/Home Office (SOHO) users that access a variety of database services from their home, office, or telecommuting PC. For a number of reasons (such as cost, logistics, or necessity), SOHO users are not attached to a local area network (LAN), and therefore must use a modem to gain access to the Server through the PSTN. These users also typically have a home telephone answering system or subscribe to a voice messaging service provided by a local telephone company.

The SOHO (and telecommuter) users represent a potential market for a service (referred to herein as a Universal Mailbox Service) that permits users to employ, via their PCs, the standard voice and facsimile messaging features currently available only via a telephone. A primary object of the present invention is to provide a system having the capabilities required to support SOHO users needing the flexibility and convenience of accessing voice, facsimile and data messaging services via a personal computer.

SUMMARY OF THE INVENTION

The present invention provides a system that graphically portrays a telephone-based messaging mailbox to a PC-based user and enables the user to operate on mixed and multimedia messages. One presently preferred embodiment of the invention provides a "Universal Mailbox Service" as part of a Network Applications Platform, within a Client/Server architecture. The invention permits a variety of Windows/PC-based applications to perform all the functions currently available to telephone-based NAP Voice and Facsimile Messaging subscribers. Personal Information Manager and Computer Telephony Integrated application vendors will be able to enhance their products with a Universal Mailbox capability. To implement the present invention, extensions can be provided to the current complement of NAP hardware and software components. Additionally, an NAP Application is used to give PC users access to the messaging services provided by the NAP, and an interface and protocol permit the exchange of data and voice-based information between the Client and Server.

In preferred embodiments of the invention, interactions between the user's PC (Client) and the Messaging System (Server) occur by two methods. Voice messages are exchanged between Client and Server in an audio (analog) form, rather than a digital format employed when storing a voice message on a computer disk. The user's DTMF capable telephone, connected to the Server through the PSTN, is used to review or create a voice message. This method is advantageous because of digital format incompatibilities between Client and Server systems and the delays associated with sending a message residing on the Server to the Client prior to playing it through the Client's sound card and speakers. In addition, the user typically has a telephone on his or her desk but may not have a sound card, microphone, speakers, and additional storage space required for a digitized voice message. Data packets are exchanged between Client and Server so that message summary information and data messages can be transferred effectively.

According to one presently preferred embodiment of the invention, an icon displayed on a Windows-based PC provides users access to the Universal Mailbox messaging features. By clicking a mouse pointer on the icon, the user can review a list of available messages and then listen, delete, save, copy, or reply to the messages, annotate the messages with text, and/or send messages to other subscribers. Another method, embodied by this invention, for a user to access their messages is through another email service (such as Microsoft's MSMAIL). In this way, a Client would be notified of awaiting messages via the "in box" provided by the native interface of that mail service. The Client could then access the corresponding message by clicking on the listed message event.

As described in detail below, presently preferred embodiments of the invention provide an integrated voice, data and facsimile messaging system. The preferred system includes a Server comprising a network applications platform (NAP) running on a first computer and databases for storing voice and data messages. In addition, the system includes a Client capable of transmitting analog voice messages and digital data messages to the Server, a Client/Server interface coupling the Client to the Server and providing a medium over which the Client and Server communicate, and a Universal Mailbox Application running on the Server, the Client, or both the Server and Client. The system is capable of visually indicating to a user, via the display device associated with the Client computer, that a message has been delivered for the user and is being held by the Server. The message may be a voice, data or facsimile message. The system is particularly suited for exchanging messages among Small Office/Home Office (SOHO) users having access to one or more database services, including a voice-mail service. The SOHO users are typically not attached to a local area network (LAN) and gain access to a Server of the messaging system through a public switched telephone network (PSTN), a telephone and a personal computer (PC).

DETAILED DESCRIPTION OF PREFERRED EMBODIMENTS

1. OVERVIEW OF CLIENT/SERVER ARCHITECTURE

Figure 1:
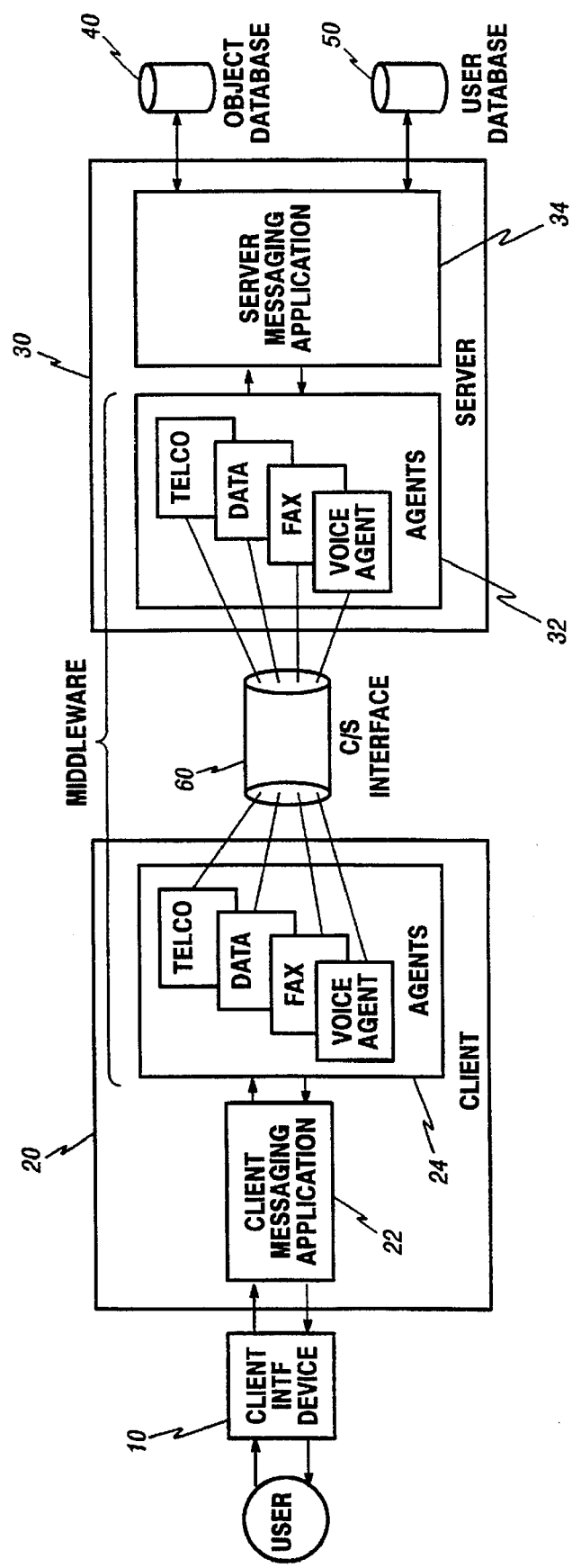
FIG. 1 schematically depicts a Client/Server Messaging System.

A presently preferred embodiment of the invention disclosed herein employs the Unisys NAP-based services (discussed above) within the framework of a Client/Server architecture. For example, current Unisys voice and facsimile messaging systems can be implemented within a Client/Server architecture. Furthermore, as described below in connection with the detailed description of preferred embodiments of the present invention, a PC-based Universal Mailbox Client/Server architecture can be implemented as an extension of the NAP system architecture. The major functional components of a Client/Server architecture are illustrated in FIG. 1. These components include the Client interface device 10, the Client PC 20, the Server 30, an object database 40, a user database 50, and a Client/Server interface 60. The Client and Server each include a messaging application 22, 32, respectively, and one or more agents 24, 32, respectively. The Client/Server interface 60 permits requests issued from the Client to be responded to by the Server. Many different types of Client/Server interface may be employed, since there may be many different media types over which the Client and Server communicate. There may also be many different types of interfaces within the Client and Server. These internal interfaces (not shown in FIG. 1) are defined for the convenience of the Client and Server and allow for an effective way of partitioning functionality within these devices. Examples of these interfaces include: MAPI/TAPI, DOS interface calls, Telephone Network interfaces, Data Communications interfaces, and the NAP AIM interface.

The Client interface device 10 allows the end user (either a person or machine) to interact in a natural way with the information requests and responses between Client and Server messaging applications 22, 34. This device is typically one of convenience or availability, and may be optimized for some, but usually not all, types of interactions between Client and Server. Examples of Client interface devices include telephone handsets (speaker and microphone), DTMF (dual tone multi frequency) keypads, keyboards and video displays, facsimile scanners and thermal printers.

The Client 20 is responsible for presenting the Server's response to the Client's request to the Client interface device 10 in an appropriate format. The Client should be able to interpret and convert a user's request, provided via the Client interface device 10, into a previously agreed-upon format acceptable to the Server 30. To interact with the user and Server in an appropriate fashion, the Client employs a state machine, or script, that invokes the proper Server requests (i.e., requests sent to the Server) in response to user requests, and provides the user with a correct menu of options. Due to the nature of the Client interface device 10, it is sometimes possible and practical for the Client functionality to be implemented within the Server, as where the Client interface device is a telephone or facsimile machine.

The Server 30 is responsible for receiving requests from the Client 20 and processing these requests to provide the Client with the appropriate response. A response could, for example, be additional information about previously received information, a summary of results of a database query, or a menu of available options from which the Client can choose. The Client typically follows a script that allows for a logical stepwise dialogue. This script can be represented in many different ways, such as call flow diagrams, menu diagram, function diagrams, or state diagrams. State diagrams are used in this specification to illustrate the Client-Server interactions.

As depicted in FIG. 1, there are a variety of agents 24, 32 used by the Client and Server applications 22, 34 to communicate across the interface 60. There could be, for example, a unique Client and Server agent to communicate across a telecommunications network, to send and receive voice files or facsimile images, to exchange data packets, etc. This list is limited only by the number of different media types the Client and Server need to communicate across to accomplish their mission. In a Client/Server architecture, agents 24, 32 provide the functionality used to adapt the Clients' and Server's internal interfaces to interfaces that conform to the corresponding interface media. For example, in the case of facsimile, the functions within the Client 20 and Server 30 implementing the facsimile (T.30) protocol and then converting the resulting binary protocol into one that can be transported across the public switched telephone network (PSTN) is defined as the agent.

The Client/Server interface 60 provides the formal definitions for Client requests and Server responses. Its ultimate function is to allow the Client 20 to access the resources available within the Server 30. These definitions transcend the specific transport media employed, so that, for example, a "review voice message" request can be fulfilled using either a data or voice (DTMF) medium.

The following discussion illustrates how the Unisys Voice Messaging System functionality, which is an example of a voice-based Client/Server model, could be modified to conform to a Client/Server architecture.

The Client interface device 10 is provided by a DTMF capable telephone (connected to the PSTN). The Client 20 presents a series of voice menus to a human user through the speaker contained within the telephone handset, and the user responds to these selections by depressing keys on the telephone's DTMF keypad or by using the on-hook/off-hook capabilities of the telephone. At specific times, the user is asked to record a voice message, using the microphone contained within the telephone handset, and then indicate the completion of this recording session by depressing a DTMF button on the keypad. As part of this interaction, the Server 30 determines the capabilities available to the Client, produces a list of options from which the Client can select at each stage of the interaction, and provides for an orderly selection from a list of Client messages. In this example, the voice/DTMF dialog should be viewed as an interaction between the user and Client, not Client and Server. The Client/Server interaction occurs at a different level, in which representations of the voice menu and DTMF selections are exchanged.

Due to the limited capabilities of a standard voice telephone, the Client functionality must be implemented in some other place. Although the telephone could be attached to a co-located piece of equipment containing the functionality required by the Client 20, it is more economical to dispose this functionality within the Server's equipment. As one goes from a voice-based to a facsimile-based and finally to a data-based Client/Server model, the separation between Client and Server functions becomes more distinct. This is because it becomes more practical to implement the Client functionality within the Client 20 as the Client equipment becomes more sophisticated (i.e., programmable).

THUS, a voice-mail system along with a Network Applications Platform and a DTMF-capable telephone can be used to satisfy the service requirements of a Client/Server-based messaging system. This means that, in the case of voice messaging, the Client can interact (issue requests and receive responses) with the voice messaging Server using a standard DTMF-capable telephone when employing a voice-based signaling protocol. In the case of facsimile messaging, the Client and Server can interact using a Group III capable facsimile station when employing a facsimile-based data communications protocol.

2. HARDWARE REQUIREMENTS/DESCRIPTION

The Universal Mailbox messaging system disclosed herein can be implemented within the confines of the Unisys NAP architecture through the use of hardware and software extensions. For example, existing NAP hardware components will continue to supply the voice and facsimile capabilities required by the Universal Mailbox Service. Any additional hardware required to provide the Universal Mailbox Service to PC-based users will not affect existing telephone-based users. Additional NAP voice and facsimile hardware is needed only to support the capabilities required for the new PC-based users.

The "Voice View" technology, developed by Radish Communications Corporation for transacting both data and voice communications over a single telephone connection, may be employed to conduct data and voice transactions over the same telephone connection. This technology is or will soon be publicly available in modems, facsimile machines and voice-mail systems, and is described in U.S. Pat. No. 5,164,982, Nov. 17, 1992, titled "Telecommunication Display System."

3. SOFTWARE a. Software Architecture

Preferably, the software required to provide the capabilities for the Universal Mailbox Service will operate on the hardware used by existing NAP customers. The appropriate standard A Series hardware and software supports the data communications interface for communication with the unique external hardware required by this product.

Preferably, existing NAP users will be able to migrate to the Universal Mailbox Service in a method similar to the one currently employed when installing a new release of NAP software and additional telephone network interfaces. For example, to add the Universal Mailbox Service to an existing NAP system, the additional hardware components, Universal Mailbox application, and the release of NAP containing the required Data Services extensions would be installed. The unique hardware components would be installed between the PSTN and the A Series system. The only other A Series configuration change would be to install the appropriate data communications hardware and software. In this example, the Universal Mailbox application and its associated NAP software and hardware extensions coexist with all other NAP hardware, environmental software, and applications.

Figure 2A:
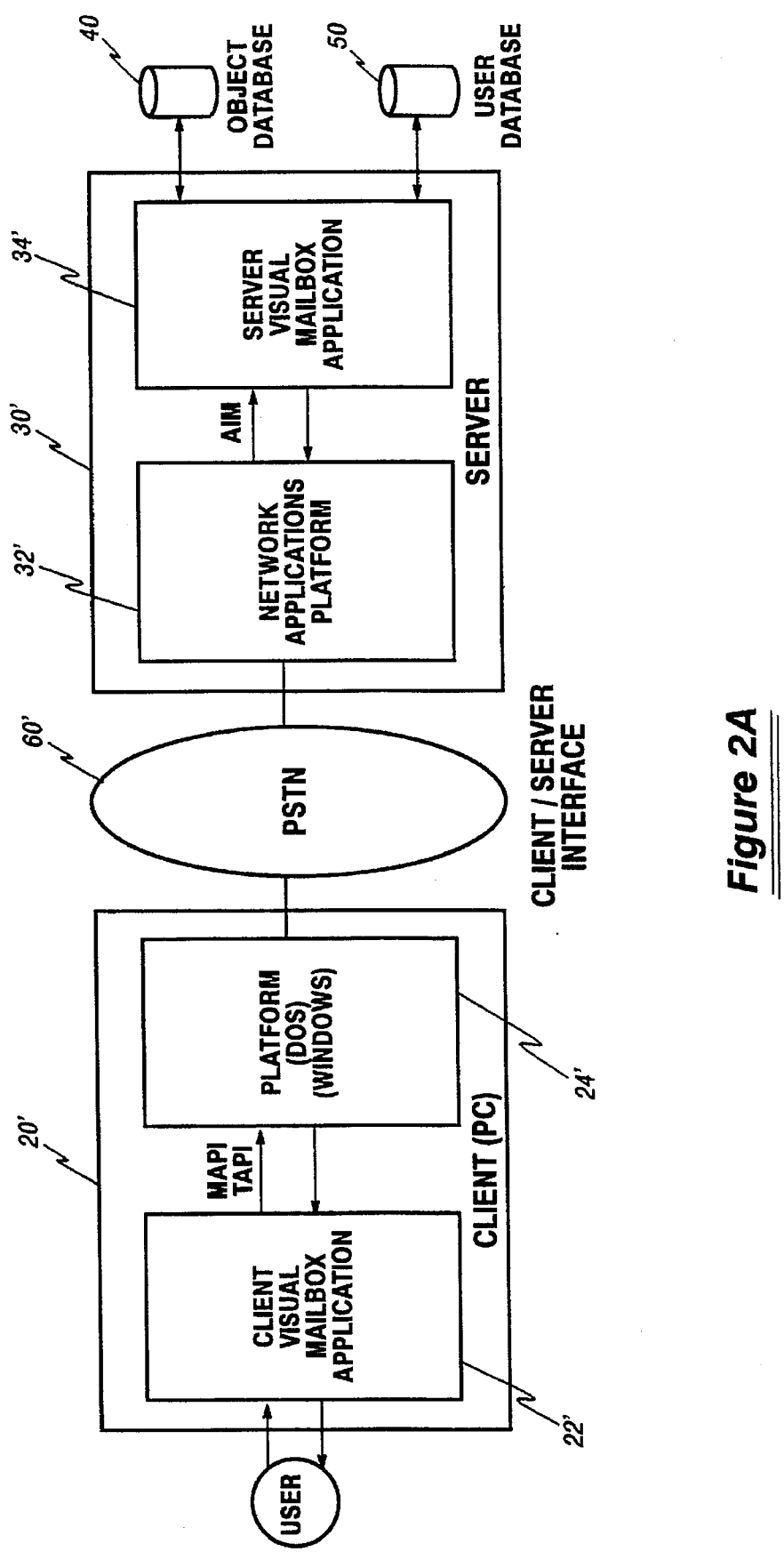
FIG. 2A schematically depicts one embodiment of a Client/Server Messaging System employing a Universal Mailbox System in accordance with the present invention.

FIG. 2A depicts one presently preferred embodiment of a Client/Server Messaging System in accordance with the present invention. This system includes a PC-based Client 20' and a Server 30' interconnected by a PSTN 60'. The Client 20' includes a Client Universal Mailbox Application 22' and a Windows/DOS Platform 24' The Server 30' includes an NAP 32' and a Server Universal Mailbox Application 34'. In this way, the NAP 32' and PC 20' provide the Server and Client functionality, respectively, over the PSTN 60'. To enable the NAP 32' to accommodate a PC-based Client/Server messaging architecture, it is extended so that it provides the ability to interact with the Server via a PC Client and a signalling protocol allowing the transfer of both voice and data in a coordinated fashion over the existing telephone connection.

As shown in FIG. 2A, the Client PC 20' implements the agent and user interface functions within the Platform block 24'. In a Windows environment, using a MAPI/TAPI interface along with the appropriate extensions, the Client Universal Mailbox Application 22' communicates through the PSTN with the NAP-based Server 30'. The Server's agents are implemented using NAP hardware and software components. In this way, the Server Universal Mailbox Application 34' uses the AIM interface to communicate with the PC-based Client 20' through the PSTN 60'. The Server Universal Mailbox Application 34' also has access to the object database 40, which serves as the repository for all voice, facsimile, data, image, etc., files exchanged between Client 20' and Server 30'. The Server application 34' also maintains the user (subscriber) database 50, which contains information concerning each user of the service, along with references to their respective objects.

There are a variety of interfaces involved with the interaction between the PC-based Client 20' and the NAP-based Server 30'. The three major interfaces are the AIM interface between the Server Universal Mailbox Application 34' and the NAP 32'; the MAPI/TAPI interface between the Client Universal Mailbox Application 22' and Windows/DOS 24'; and the interface between the Client and Server systems, referred to as the Client/Server interface (CSI). These interfaces and specific illustrative commands and responses are described below.

In general, interactions between the Client 20' and Server 30' are driven by the Client. Client requests provide the Server with specific instructions and information, to initiate a transition from one state (or screen) to another. The Server responds to Client requests by returning the information requested by the Client. Although these requests, and subsequent responses, are issued through an application/platform interface (API), they are not all implemented across the CSI in the same fashion. This means that, in some cases, the Client uses signaling capabilities provided by the PSTN, such as going off-hook and dialing the Server's telephone number to originate a session, or going on-hook to terminate a session. The Server uses the ring signaling provided by the PSTN to indicate that an incoming call is present, and a Simplified Message Desk Interface (SMDI) (a data communications interface provided by some telephone switches) to identify the telephone number of the incoming caller. In another case, interactions between Client and Server take the form of data message packets passed across the PSTN 60' using the VVB (Voice View Bridge) protocol. Voice messages and DTMF signaling are used between the Client and Server when reviewing and recording voice messages.

Figure 2B:
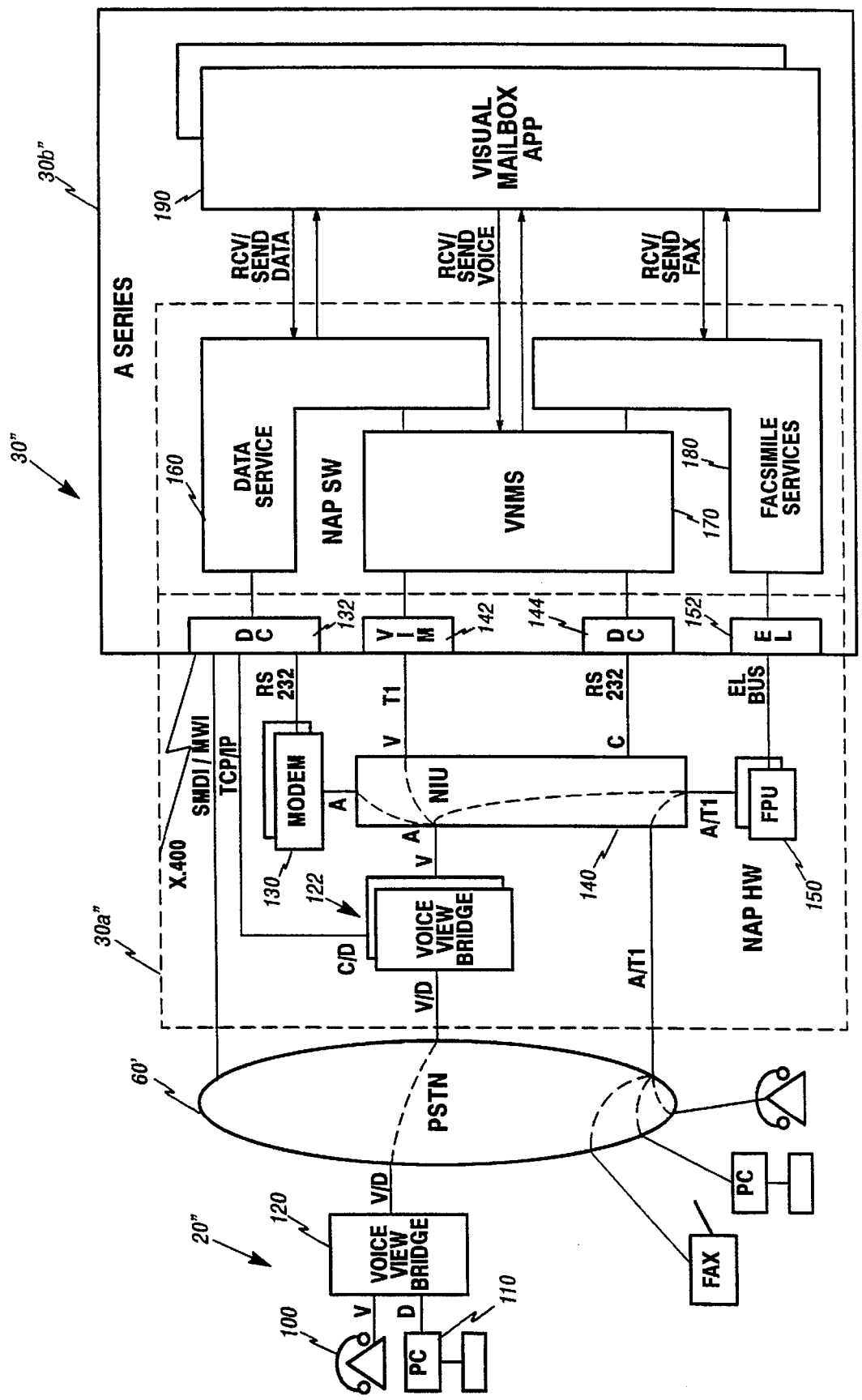
FIG. 2B depicts another embodiment of a Client/Server Messaging System in accordance with the present invention. This embodiment includes the NAP architecture extended for Universal Mailbox applications.

FIG. 2B depicts another embodiment of a Client/Server Messaging System in accordance with the present invention. In particular, this figure illustrates how the Unisys NAP architecture could be extended to provide for the PC-based Client/Server messaging system disclosed herein. This figure depicts the existing components used to satisfy specific functions within the architecture, and those functional components that are required when extending the architecture. The functional blocks highlighted in gray are new, i.e., are not currently implemented in the present NAP architecture.

The embodiment of FIG. 2B includes a Client 20", a Server 30", including NAP hardware 30"A and NAP software 30"B. The Client 20" includes a DTMF capable Telephone 100, a PC 110, and a Voice View Bridge 120. The NAP hardware 30"A includes a Voice View Bridge 122, a modem 130, an NIU 140, and an FPU 150. Interfaces between the NAP hardware and NAP software include a DC 132, a VIM 142, another DC 144, and an EL 152. The A series NAP software 30"B includes a data surfaces component 160, a VNMS 170, facsimile services 180, and a visual mailbox application 190.

The Universal Mailbox Application 190 communicates with the NAP software environment as shown. In addition to the standard telephone network interfaces and the voice and facsimile commands currently provided by NAP, a new set of commands and responses are employed for sending and receiving data packets between Client 20" and Server 30". The Server's Voice View Bridge (VVB) 122 enables both voice and data communications to exist over the same telephone connection. The VVB 122 is placed between the PSTN 60' and the NAP's Network Interface Unit (NIU) 140, and is responsible (along with the Client's VVB 120) for coordinating the data and voice flow over the established telephone connection. When the A Series Voice Server 30"b originates or answers a call through the PSTN 60', a voice path is established through the NIU 140 to the Voice Interface Module (VIM) 142 (using a T1 interface) and, at the same time, a corresponding data path is established through the VVB 122 across the TCP/IP interface. When the data facility provided by the VVB 122 is requested, by either the Client 20" or Server 30" using its corresponding data communications interface, the VVBs 120, 122 will silence the voice path during the data transfer period. If the data transfer service is not requested, a voice path will continue through the VVBs.

The components employed for the transmission and reception of facsimile messages are also represented in FIG. 2B. These components include the Facsimile Processor Unit (FPU) 150 and Express Link DLP (EL) 152. A Data Link Processor (DLP) provides data transmission capability between the A-Series IO processor and some external device. In this case the external device is an FPU. Calls can be routed to a facsimile port using the switching capabilities within the NIU 140. The facsimile signaling data and images (tones) pass through the VVB 122 in an analog fashion, and so do not require the VVB's data mode capabilities. The Station Message Desk Interface (SMDI) is a signaling interface between the NAP and the PSTN 60' and is used by NAP to acquire the calling and called telephone number. This interface is used to set and clear the Message Waiting Indicator (MWI) that informs the subscriber of messages, as indicated by a stutter dialtone or battery reversal on the telephone wires (which is used to momentarily illuminate a message lamp on some telephones).

The left side of FIG. 2B depicts the Client PC 110, in this example running a Windows-based Universal Mailbox (UMB) application, along with a telephone 100 connected through the VVB 120 to the PSTN 60'. There is a data path from the Client PC 110 to the VVB 120 and a voice path from the Clients' telephone 100 to the VVB.

Figure 2C:
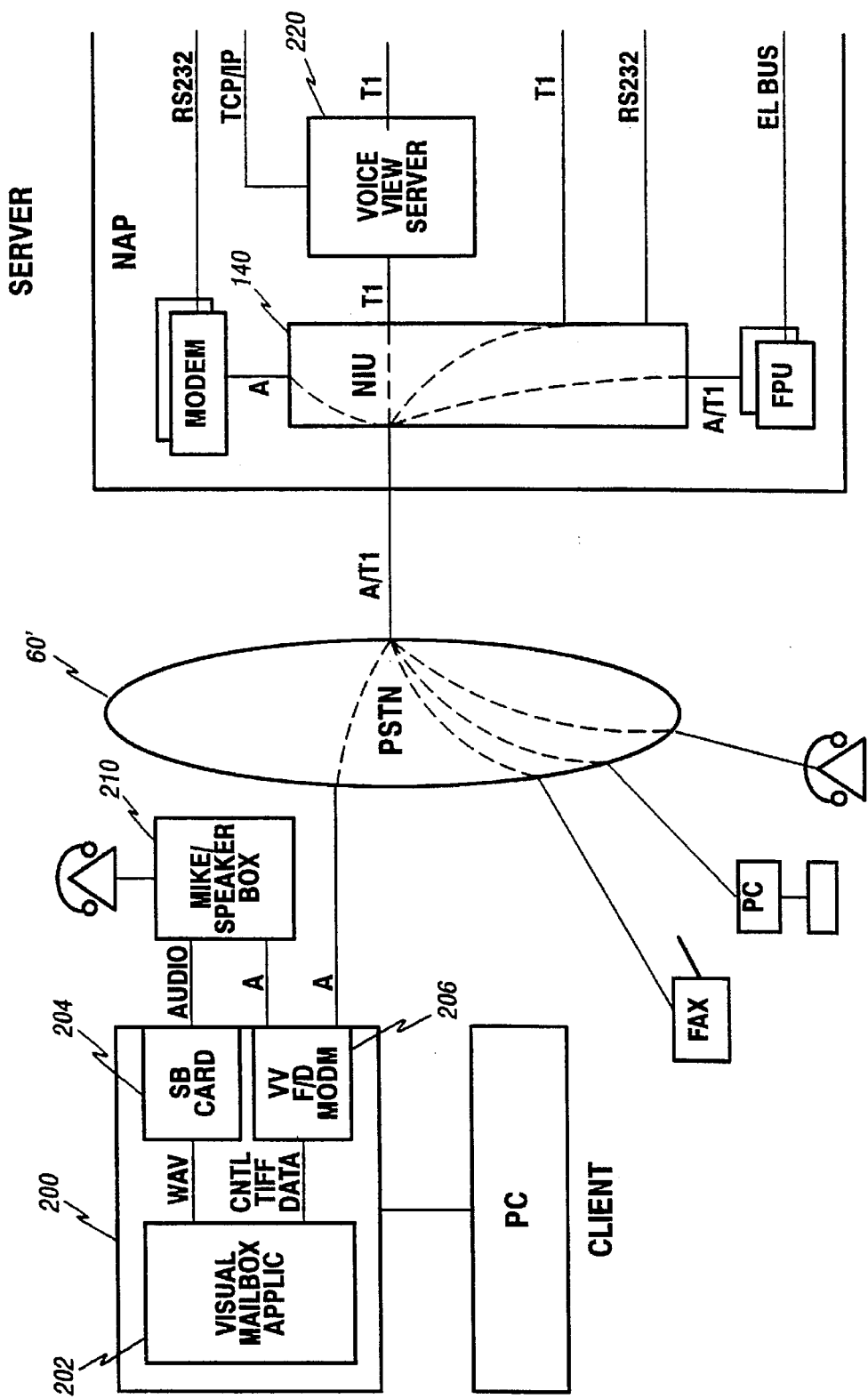
FIG. 2C depicts another embodiment of a Client/Server Messaging System in accordance with the present invention.

Although the Client's VVB 120 is depicted in FIG. 2B as an external function, it could be part of a commercially available PC-based facsimile/data modem, and therefore it could be deployed as illustrated in FIG. 2C, which depicts an alternative embodiment of the Universal Mailbox Client/Server architecture. This embodiment includes a Client PC 200, including a Universal Mailbox Application 202, an SB card 204, and a Voice View Modem 206. The Client PC 200 is connected as shown to a microphone/speaker box 210. The Server in this embodiment includes a Voice View Server 220. The PC sound card 204 is used for those instances where the user desires to either record or play back a voice message using a file located on the Client PC disk.

In addition, the NAP VVB capability can be deployed as a multi-port Server 220, as depicted in FIG. 2C, between the NIU 140 and VIM. In this way, a PSTN-connected port does not have to be predisposed or dedicated to a Voice View session. Rather, the Server application 220 can determine if the incoming or outgoing call requires Voice View services, and then (using the NIU's RS232 interface) connect the call to the appropriate voice facility.

A Client initiated session is described next to assist the reader in understanding how each of the functional blocks depicted in FIG. 2B is used. To begin the session, the Client 20" initiates a call through the PSTN 60' to the Server 30" by dialing the Server's telephone number. The Server, upon detecting this incoming call, answers the call via commands sent by the A Series 30b" to the NIU 140 over the NIU's RS232 command interface. The Server then uniquely identifies itself as a Voice-mail Server, using either voice-based interactions, provided through the NIU by the VIM connected to the NIU using a T1 voice interface, or data-based interactions provided through the VVB command/data interface connected via a TCP/IP interface to the A Series.

The Client 20", after receiving the Server's identification, begins interacting with the Server 30" using either the telephone's voice interface or the command/data interface between the PC 110 and VVB 120. The Client begins by uniquely identifying itself, and then, using either voice or data interactions, communicates with the Server in performing operations from a selected suite of functions, which may include one or more of the following functions: message summary, message review, message disposition (handling), message sending, or administration.

The Server Universal Mailbox Application 190 uses the NAP hardware and software facilities to communicate with the Client Universal Mailbox Application (block 202 in FIG. 2C; block 22' in FIG. 2A). An Application/Programmers Interface (API) between the Server Application 190 and NAP is used to invoke the services provided by the NAP. These services include initiating and answering calls (VNMS 170) through the PSTN 60'; using voice (VNMS) and Facsimile Services 180 as part of a voice-based interaction; and commands to send and receive data packets as provided by the Data Services function 160.

b. STATE DIAGRAMS

As described above, the Client is responsible for presenting Server responses to the user. Interactions between the Client 20' and Server 30' (FIG. 2A) or Client 20" and Server 30" (FIG. 2B) follow a script, according to which each Client request results in the Server responding with some amount of information along with a menu of additional requests that can be invoked. The state flow diagram in FIG. 3 is employed herein to describe this interaction between the Client and Server.

Figure 3:
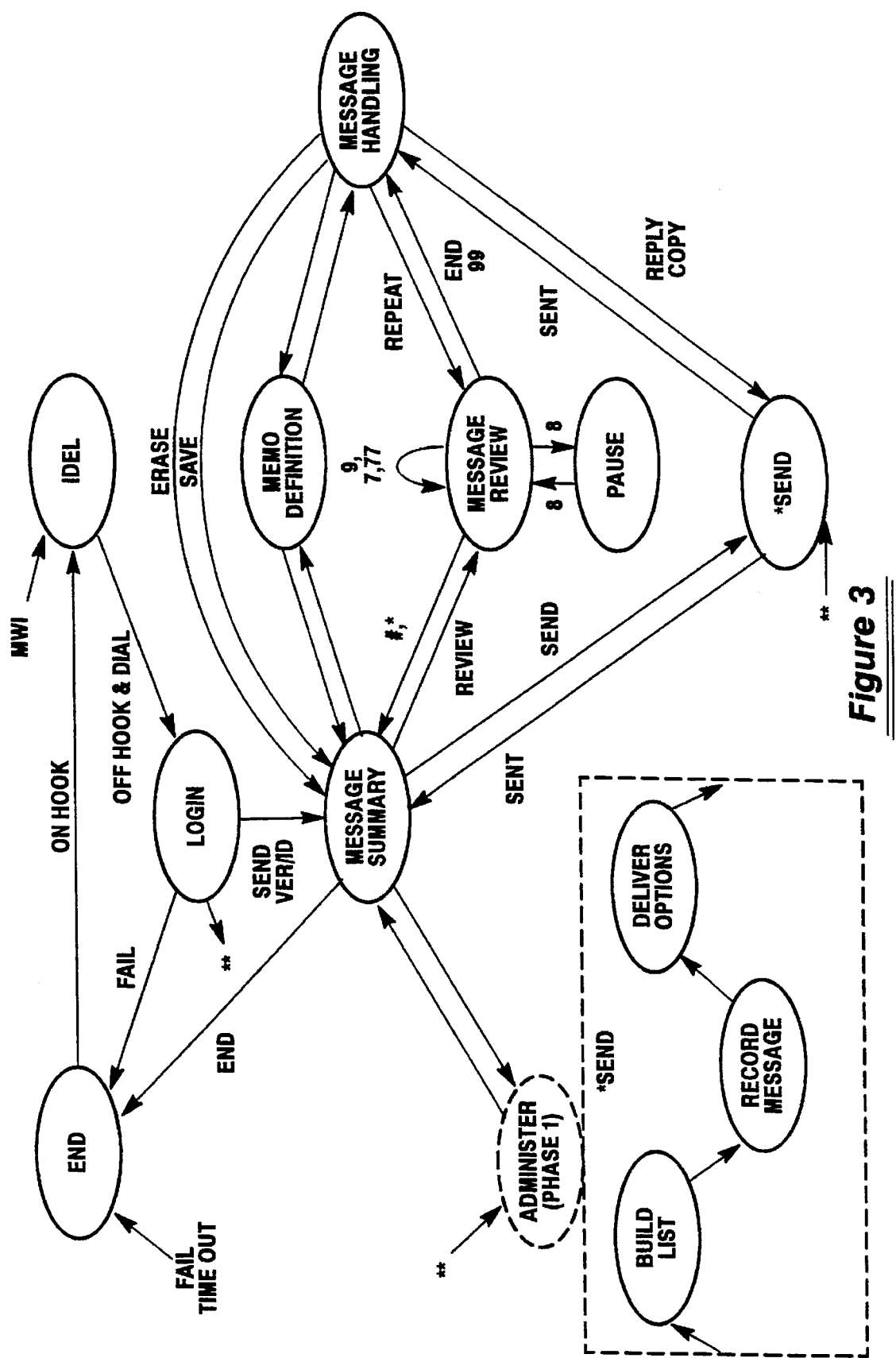
FIG. 3 depicts a state diagram for the Universal Mailbox System.

Each state in which the Client's application can reside is represented in FIG. 3 by an ellipse. Another way of representing a state is as a screen display presenting a menu of options on the Client's display device, as in screens 300 through 380 in FIGS. 4A–4C. The arrowed lines represent the transition from one state to the next. A state transition is defined as a two part process including the Client's request for service and the Server's corresponding response. Using an option menu example, a state transition is initiated by the selection of a specific menu option. The Server's response to this requested option completes the state transition to the next state or option screen.

The state diagram of FIG. 3 is a shorthand method to represent the traversing of a sequence of Client option menus. It should be noted that this state diagram is not intended to describe all possible states and associated transitions for the Client's Universal Mailbox application, but is merely an example depicting some of the possible Client states and the actions leading to transitions from one state to the next. Furthermore, error recovery (i.e., the Clients' responses to time-out conditions or erroneous Server responses) is not shown in this diagram. FIG. 3 also serves as a vehicle to further describe the Client menu screens of FIGS. 4A–C. In addition, the state transitions in effect define the Client/Server Interface.

Figure 4A:
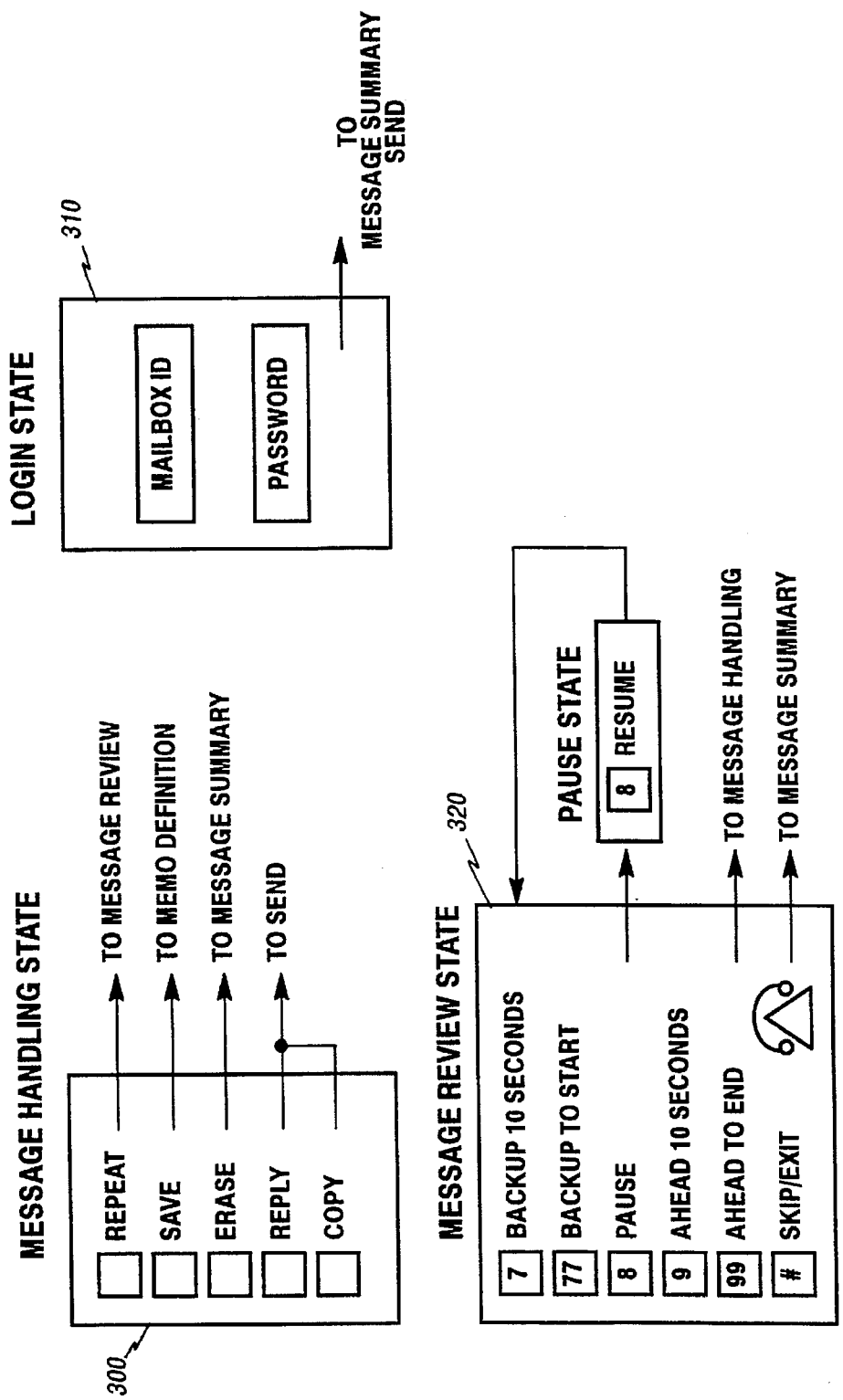
FIGS. 4A through 4C depict Client screen displays for the "Login", "Message Summary", "Message Review", "Message Handling", "Memo Definition", and "Send" states, all of which require Client interaction (i.e., provide selection options or information).
Figure 4B:
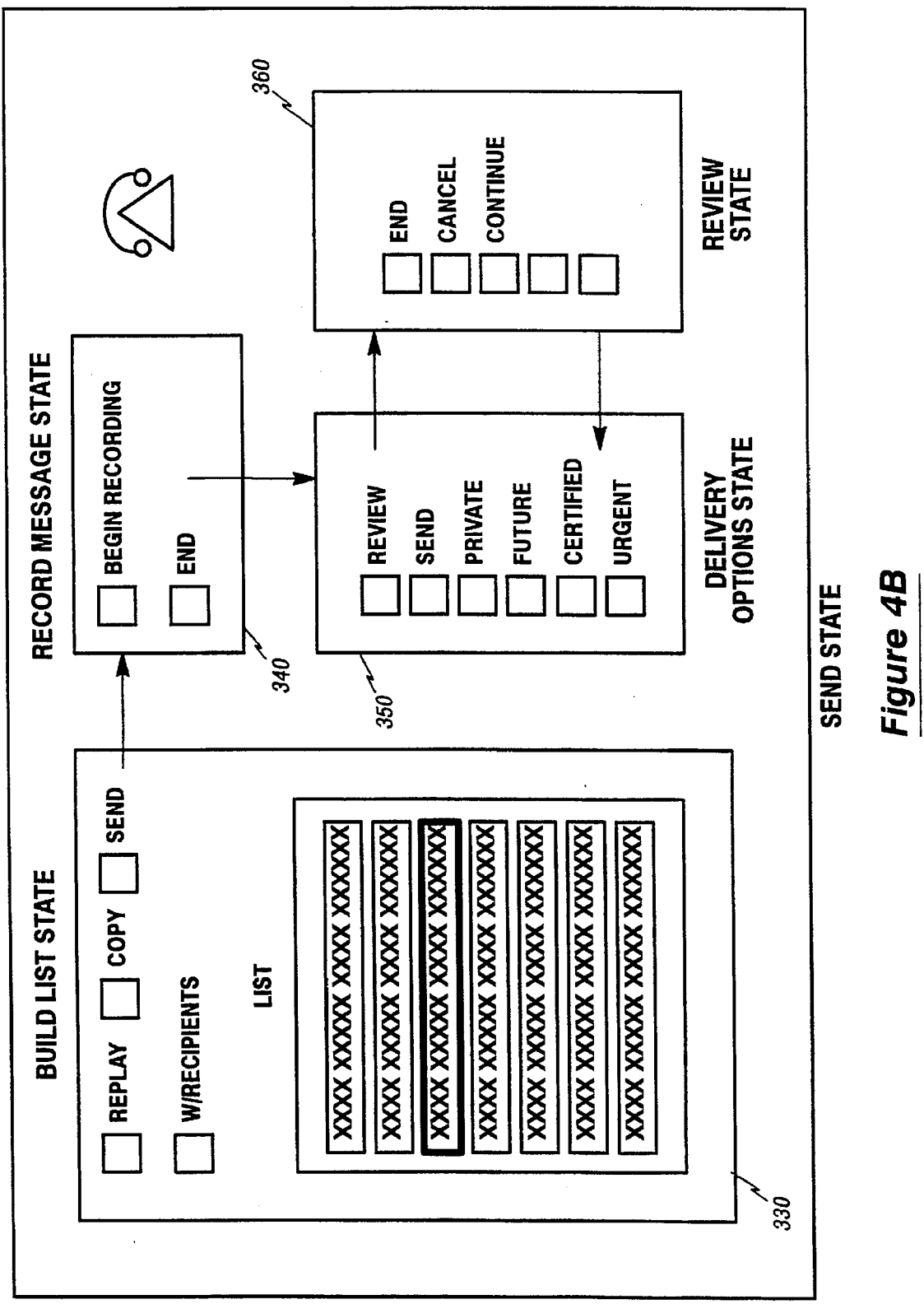
Figure 4C:
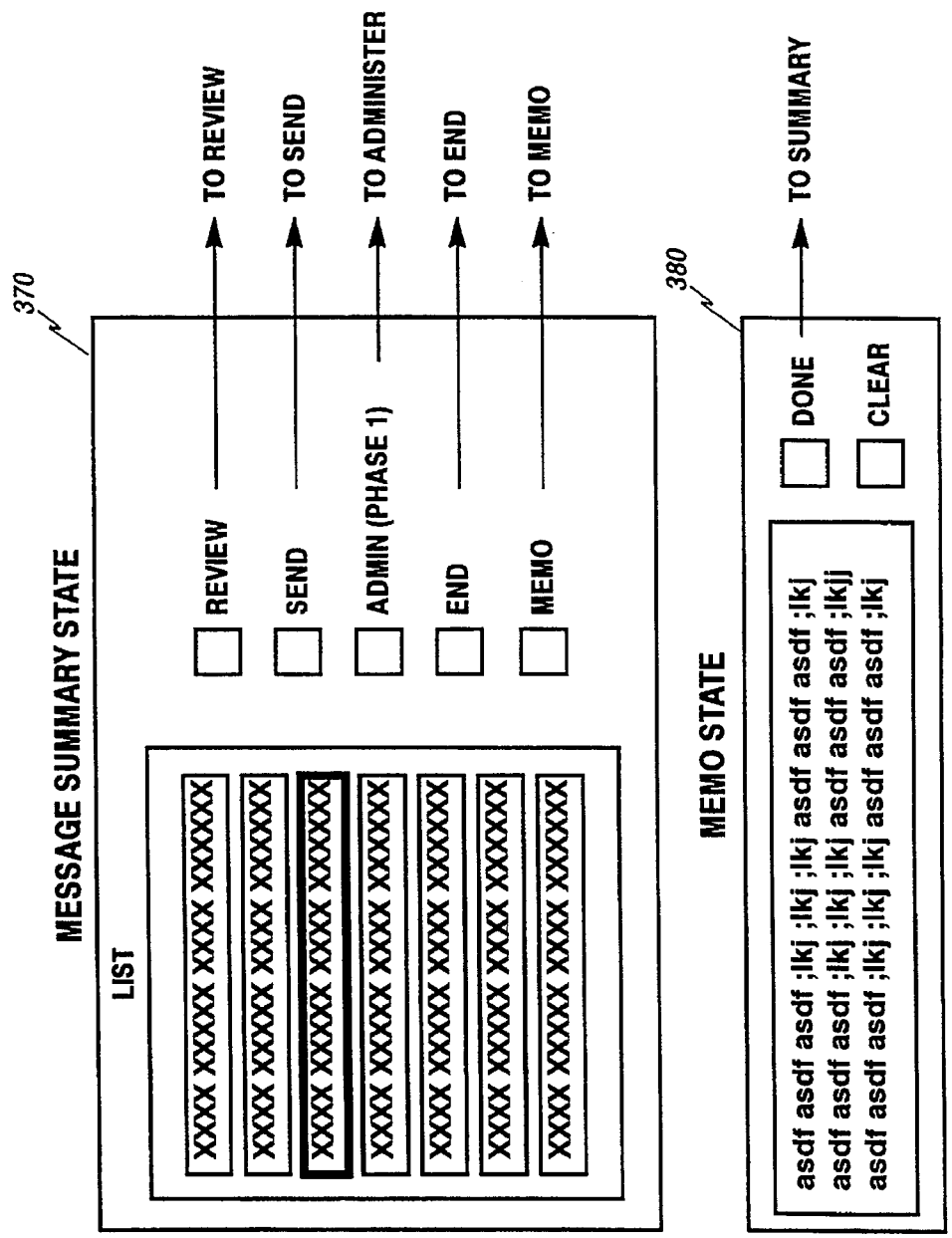

The following states are defined for the Universal Mailbox service: Idle, Login, Message Summary, Message Review, Message Handling, Memo Definition, Send, Administer, and End Examples. Each of the states requiring Client interaction (i.e., providing selection options) is represented in FIGS. 4A through 4C, and references are made to the specific Client screen options represented in these figures. This specification describes the general format and content of exemplary Client Universal Mailbox application screens but does not describe specific screens in detail.

Each Client screen can contain the following objects, which can be selected by the user:

| | |
|---|---|
| buttons | used to define selectable options; |
| list windows | used to display and select information requested from the Server; |
| note window | used to define textual data that can be sent to the Server. |

The reader may also refer to FIGS. 6A through 6D, which illustrate the major Client and Server interfaces and their associated interactions when transitioning between states. A more detailed description of these interfaces is provided after the description of the state transitions.

The Idle state is the initial, inactive condition that the Client application assumes prior to beginning a Universal Mailbox (UMB) session. In this state, the Client's Windows/DOS-based system displays a UMB icon, highlighted if there are messages waiting to be retrieved. When the user desires, the icon can be used to invoke the UMB services. As this occurs, the Client begins the state transition by originating an outgoing call to the UMB Server. The Server responds by answering the call and providing a unique identification. The Client then transitions to the Login state.

The Login state uses a screen 310, as depicted in FIG. 4A, to provide the user the ability to enter a unique identification to the Server. When this state is entered, the Client automatically issues a request indicating the next desired state, and provides its unique mailbox identification to the Server. In this example, the next state is the Message Summary state (screen 370), although it could be the Administer or Send state (screens 330, 340, 350, 360). The Server's response is very much dependent upon the request. In the case of a request to transition to the Message Summary state, the Server returns a list of available messages along with a Class of Service (COS) parameter defining what options are available for this user.

The Message Summary state uses a screen 370, as depicted in FIG. 4C, to present the user a list of available messages, along with the selectable options available from this state. From this state, the user can transition to either the Message Review, Send, or Administer states. For example, the user could highlight an entry in the message list and select the Review option (screen 320). A request to review the selected message is made to the Server, which begins the transition to the Message Review state. The Server response to this request is to play the requested message for review by the user, after the Client transitions to the Message Review state.

In the Message Review state, as depicted in screen 320 of FIG. 4A, the user is presented with the selected message for review. In selecting review of a voice message, the user can select from a variety of options during and after the review. If Backup 10 Seconds, Backup to Start, or Skip Ahead 10 Seconds is selected, the Client issues the corresponding request to the Server. The Server responds accordingly, and the Client is returned to the Message Review state for further option selection.

Selecting Pause causes a request to be issued to the Server. The response is the cessation of the message, with the Client entering the Pause state. To exit from the Pause state and return to the Message Review state, the user selects the Resume option on the Client's screen 320, as depicted in FIG. 4A. The Server response to this request is the continuation of the message from where it was paused.

The Skip Ahead to End option, or the completion of message review, causes the Server to issue a response that transitions the Client to the Message Handling state (screen 300 of FIG. 4A).

In the Message Handling state, represented by screen 300 in FIG. 4A, the user is presented a variety of message disposition options from which to select. If the user selects the Repeat option, the Client issues the corresponding request. This request causes the Server to issue a response that transitions the Client back to the Message Review state, and the Server then plays the requested message for review by the user.

Selecting the Erase option causes a request to be issued to the Server. This results in a response that returns the Client to the Message Summary state and provides the Client corresponding updates to the information presented to the user.

Selecting the Reply or Copy option causes the Client to issue a request. This results in the Server issuing a response that transitions the Client to the Send state.

The Save option causes a request to be issued to the Server. This results in a response from the Server that transitions the Client to the Memo Definition state (screen 380, FIG. 4C).

In the Memo Definition state, as illustrated in screen 380 of FIG. 4C, the user is given the ability to annotate the saved message with text entered in the note window. Selecting the Done option causes a request to be issued to the Server that results in a response returning the Client to the state that originated the request (as the memo state can be entered from a number of other states), and provides the Client the corresponding updates to the information presented to the user.

As illustrated in screens 330, 340, 350, and 360 of FIG. 4B, the Send state can be entered from a number of other states. Regardless of the prior state, the Client first enters the Build List state (screen 330) in which the user may enter a list of message recipients. Selecting either the Reply, Copy, or Send options causes the Client to issue a request. This results in the Server issuing a response that transitions the Client to the Record Message state (screen 340).

In the Record Message state, the user may begin recording either: an introductory message if the Reply option was selected, or an annotation if the Copy or Send option was instead chosen. The End option is selected when the user is finished recording a voice message. This results in the Server issuing a response transitioning the Client to the Delivery Option state (screen 350).

In the Delivery Option state (screen 350), the user can select from a number of available delivery options, which are themselves defined for the user based upon his or her COS options. The user may also choose to review a previously recorded message and re-record it if necessary. Selecting an option causes the corresponding request to be issued to the Server. This results in a response from the Server returning the Client to the original state prior to the transition to the Send state.

The Administer state becomes the repository for operations that modify either Client-maintained configurable parameters or those residing on both the Client and Server. Password updating is an example of the type of operations that are selectable from within the Administer state and affect both the Client and Server.

The End state is transitioned to by all the other states when either an error is detected or the user wants to terminate the session established with the Server. Errors are detected by the Client, as the result of a valid but inappropriate response provided by the Server or an invalid response that cannot be recovered from within that state. The Server can cause the Client to enter the End state if, for example, the Client has not provided a request after a predetermined time interval. As a result of these events, the Client begins the transition to the Idle state by sending a request to the Server. The Client then terminates the session by going on-hook. A response from the Server is not required for transition to the Idle state, as the condition that caused the transitions to the End state itself may have been the result of a terminated session.

4. FUNCTIONAL DESCRIPTION

Figure 5:
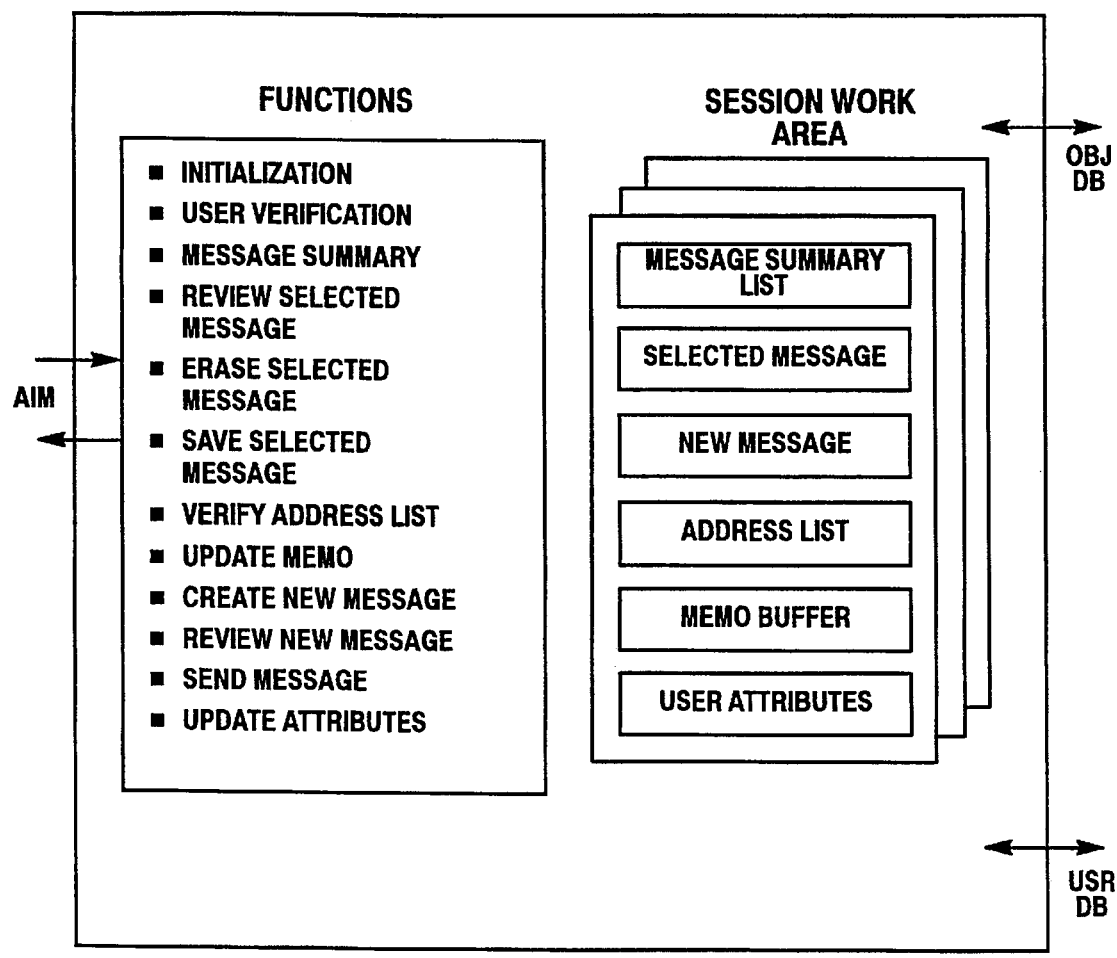
FIG. 5 provides an overview of functions performed by the Server Universal Mailbox Application.

As previously described, the Server is responsible for responding to all Client requests, as well as maintaining the Client (user) profile(s) and references to the Object database. In essence, the Server provides a collection of event (request) driven functions, which allow Clients to operate on information contained within their databases. Instead of using the state diagram and screen drawings employed to illustrate Client operations and interactions with the Server, FIG. 5, a simpler diagram, is used to illustrate how the Server responds to Client requests. FIG. 5 depicts the collection of functions that are invoked when Client requests are presented by the NAP to the Server's Universal Mailbox Application. These functions perform the operations required to satisfy a specific Client request. Client requests can therefore operate on Client specific entries in the user and object databases.

To minimize the information transferred between a Client and the Server, a Session Work Area is defined. The Session Work Area is uniquely established for each current Client session and retains information that is frequently used during the session. The Server Universal Mailbox Application functions provide the Client with a way of operating on the information contained in that specific Client's Session Work Area. The information in this Work Area takes the form of pointers to messages, lists, and buffers.

The items contained within the Session Work Area and specific Server Universal Mailbox functions are described next.

Each Client's Session Work Area is established at the beginning of the Client's session. This area contains a variety of registers, lists, and buffers that can be operated upon by Client requests. Specifically, the elements within this area include: Message Summary List, Selected Message Register, New Message Pointer, Address List, Memo Buffer, Class Of Service (COS) list, and Delivery Option Register. These elements are described below.

Message Summary List

This list contains all information needed for user interface purposes and information needed by the server for data access purposes.

Selected Message Register

This register contains a pointer to the currently selected message. Preferably, only one message may be current at any one time.

Address List

This is the current list of addressed mailboxes sent to the Server by the Client.

Memo Buffer

This is the most recent memo made current by either creating, deleting, or modifying a memo associated with a message.

User Attributes

User Attributes include: class of service data, password and mailbox number, extension, guests, maximum message length, maximum messages, urgent allowed, record allowed, and review allowed.

Delivery Option Register

This is the most current delivery option chosen for a message by the Client user. Available options include private delivery, future delivery, certified notification, and urgent priority.

The Server Functions are described next.

Initialization Function

The initialization process is as follows. The Client outdials the Server. The Server recognizes an incoming call and connects the call. The Server also recognizes that this call came in on a port set aside for Universal Mailbox users. The Server allocates a voice and data port to the user. The Server then outdials the Client and sends the DTMF identifying characters "##". The PC interface receives the DTMF input and initiates the first data command to the Server, which is either the INT or INTMSG command.

User Verification Function

The Server performs verification of the user's mailbox against the user's passcode.

Message Summary Function

The Server gathers all messages and class of service data associated with the user's mailbox.

Select & Review Selected Message Function

The Server receives a current message from the Client for playback over the voice channel. The user has numerous message review handling options while the message is being played over the voice channel. These message review handling options send DTMF over the voice channel to the Server.

Erase Selected Message Function

The Server performs a database function to change the status of the message to erase.

Save Selected Message Function

The Server performs a database function to change the status of the message to save.

Verify Address List Function

The Server verifies each mailbox in the address list to ensure the user has addressing capabilities to the listed mailboxes.

Update Memo Function

The Server updates the message's memo field via database functionality. Whatever is passed to the Server in the memo data field is placed in the message's database memo field.

Create New Message Function

A new message is created whenever a record option is chosen. The user is played a recording tone prior to the recording function.

Review New Message Function

Message review options are the same as in an NAP-based DTMF application. For example, DTMF 99 indicates <skip to end>, DTMF 8 indicates <pause message>, DTMF 7 informs the application to <skip back 10 seconds>, etc.

Send Message Function

This function represents the final step in the process of delivering a message. By the time this function is invoked, a new message has been created, a list of recipients (mailbox addresses) associated with the message to be sent has been created, delivery options for the message have been defined, and an optional memo has been created. This newly created message can be sent in three different modes: as a Reply to the original sender's message that has just been reviewed, as the preamble to the selected message that is being copied to one or more recipients, or as a message that is being sent to one or more recipients. This function invokes the Sending process and results in the message being sent to the mailboxes in the address list.

Finish Function

The finish function tears down the memory associated with the user's mailbox and deallocates the voice and data port reserved for the user.

Figure 6A:
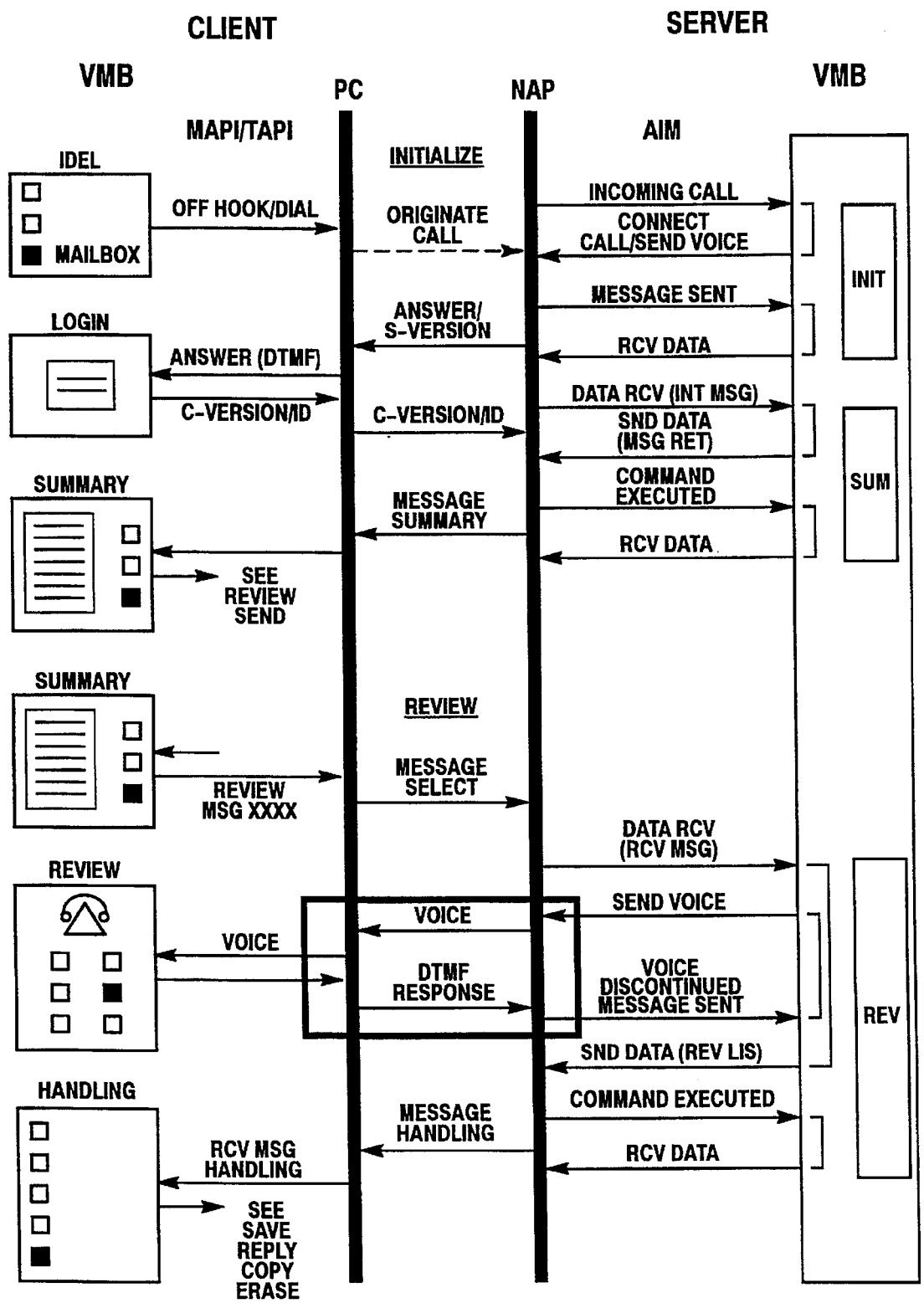
FIGS. 6A through 6E illustrate major Client and Server interfaces and their associated interactions when transitioning between states.

The commands and responses are described below. These interactions across the above-described interfaces are represented in FIGS. 6A through 6E. These diagrams identify the use of these interfaces during Universal Mailbox (UMB) state transitions, as illustrated in FIG. 3. The Client/Server interface flow diagram in FIG. 6A depicts the Client UMB application states on the left, using the Window's MAPI/TAPI interface to interact with the Server. The Server UMB application on the right uses the NAP's API to interact with the Client.

Figure 6B:
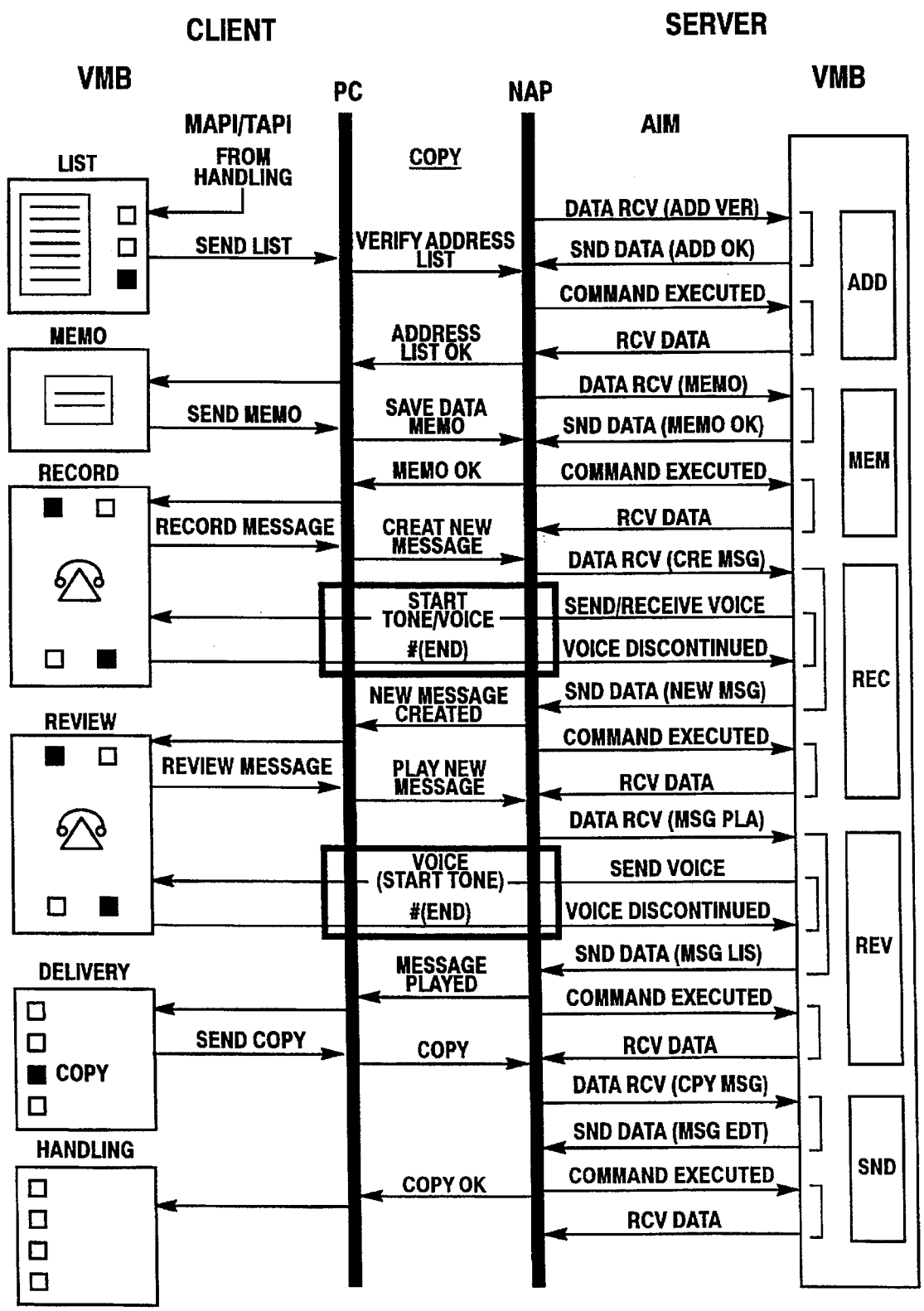
Figure 6C:
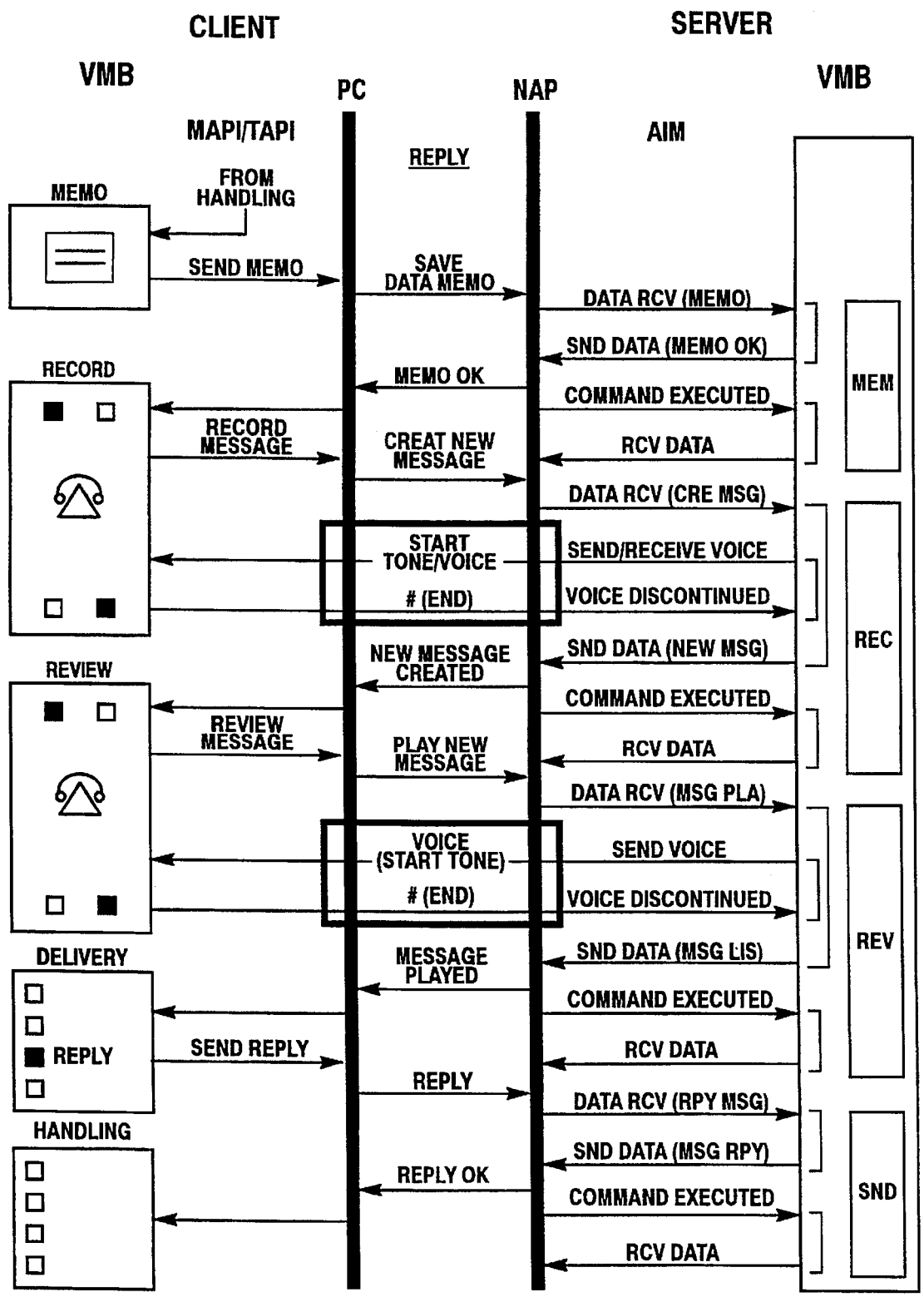
Figure 6D:
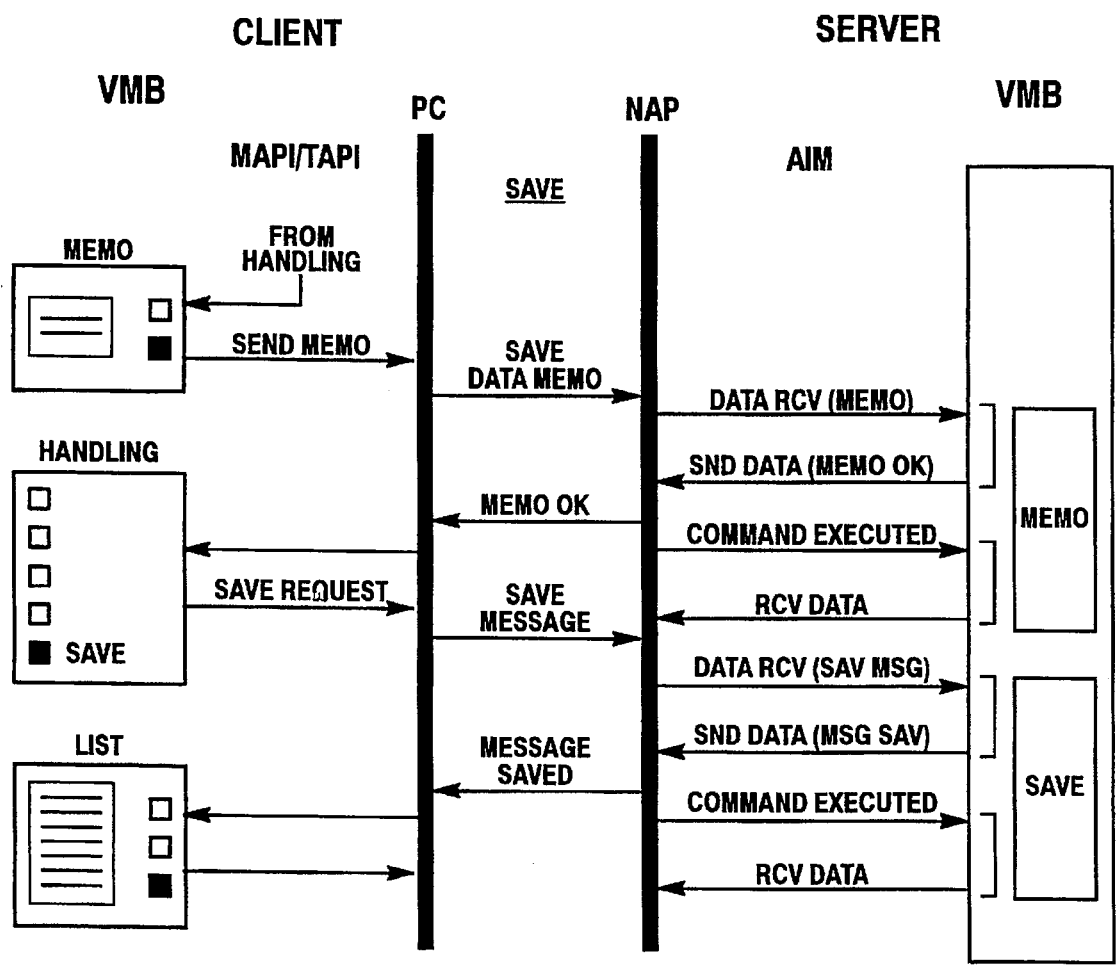
Figure 6E:
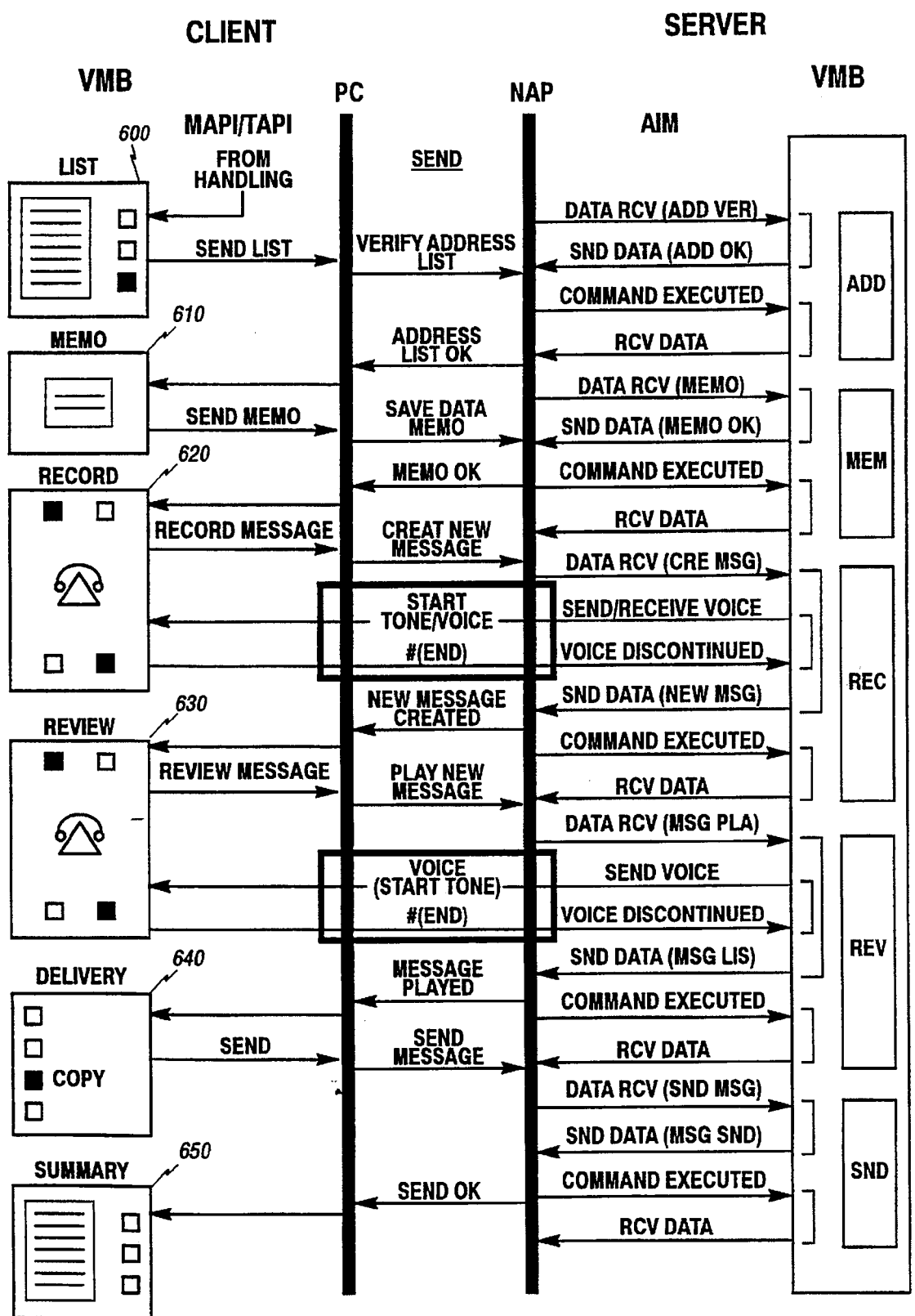

The interface flows are divided into groupings of interactions. FIG. 6A illustrates the Client/Server interactions used to proceed from the Idle to Summary state, and then from Summary (Review) to Handling state. The Client/Server interactions required to accomplish Copy and Reply are illustrated in FIGS. 6B and 6C, respectively, which show the UMB proceeding from the Handling (Copy/Reply) to Handling state. The interactions associated with the Save option are illustrated in FIG. 6D, which shows the UMB application proceeding from the Handling state back to the Summary state. The Summary (send) to Summary state interaction is then illustrated in FIG. 6E. Many more scenarios could be defined for the Universal Mailbox State Diagram. These specific examples are not intended to be an exhaustive description of the Client/Server interoperation, but merely illustrate a representative set of interactions.

The commands and responses represented in FIG. 6A–6E are summarized next.

Initialize and Review Messages—Command

Mnemonic: INTMSG;
Purpose: Initialize the Client/Server session and request a list of messages to be returned to the Client.
Valid Response: MSGRET;
Error Response: ERROR;
Description: If the user has chosen to Review Messages, after the Client/Server session has been established, the Client will automatically send a data packet containing a version id, the user's mailbox, extension, guest, and passcode information in the form of an INTMSG command. If no problems are encountered at the Server end, a MSGRET response will be returned to the Client with the message list and class of service data. Otherwise, an ERROR response will be returned indicating the type of error encountered.

Format: The command will have the following body fields.

| Field | Length | Description |
| --- | --- | --- |
| version | alpha 10 | version id (req') |
| mailbox | alpha 10 | user's mailbox (req'd) |
| extension | number 2 | user's extension |
| guest | number 1 | user's guest mailbox |
| passcode | alpha 15 | user's mailbox passcode (req'd) |

Initialize—Command

Mnemonic: INT
Purpose: Initialize the Client/Server session and allow the user to perform any function including message retrieval, message send, administration functions.
Valid Response: INTOK;
Error Response: ERROR;
Description: If the user has chosen to simply initialize the Client/Server session, an INT command will be sent to the Server. This command will contain the Client version, the user's mailbox, extension, guest, and passcode data. If no problems are encountered at the Server end, an INTOK response will be returned to the Client with the user's class of service data. If problems are encountered on the Server, an ERROR response will be returned detailing the error type. This command would be used if the user wants to either send voice-mail or perform administration functions without retrieving mailbox messages which may or may not exist.
Format: The command will have the following body fields.

| Field | Length | Description |
| --- | --- | --- |
| version | alpha 10 | version id (req') |
| mailbox | alpha 10 | user's mailbox (req'd) |
| extension | number 2 | user's extension |
| guest | number 1 | user's guest mailbox |
| passcode | alpha 15 | user's mailbox passcode (req'd) |

Get the List of Messages—Command

Mnemonic: GETMSG;
Purpose: Returns any messages in the user's mailbox from the Server.
Valid Response: MSGRET;
Error Response: ERROR;
Description: At any time after the Client/Server session has already been established, the user may choose to retrieve messages from the Server. This command allows for that functionality. No data needs to be passed to the Server since the session is already established. If the Server encounters no problems in retrieving the user's mailbox data, a MSGRET response will be returned to the Client. If errors are encountered, an ERROR response will be returned detailing the error message type.
Format: The command will contain an empty body.

Verify Address List—Command

Mnemonic: ADDVER;
Purpose: Allows verification of user selected addresses against those addresses on the Server.
Valid Response: ADDOK;
Error Responses: ADDBAD ERROR
Description: Once the user has created an address list to be associated with a send voice-mail, these addresses will be sent to the Server to verify the user has visibility to them. If the user has address capabilities to each mailbox in the address list, an ADDOK response will be returned to the Client. If one or more of the addresses in the address list are not visible to the user, an ADDBAD will be returned to the Client and the user will be allowed to change the address list and resubmit an ADDVER command. If any other type of error occurs on the sever end, an ERROR response will be returned to the Client with a detailed message type.
Format: The command will have the following body fields. The following address list is for one mailbox with extension and guest numbers specified. Multiple mailboxes and their corresponding extensions and guests may be included in the command. An upper limit will have to be defined in the future.

| Field | Length | Description |
| --- | --- | --- |
| address list<br>-mailbox (req'd)<br>-extension<br>-guest | alpha 13 | |

Create a Voice Message—Command

Mnemonic: CREMSG;
Purpose: This command instructs the Server to play a recording tone to the user and then record either a message or introductory remark.
Valid Response: NEWMSG;
Error Response: ERROR;
Description: This command informs the Server that some form of message is to be record. A recording tone will be played to the user over the voice channel and recording will begin. During the process of recording the Client user will be offered an <end recording> button which can be used to end the recording. Otherwise the user may allow the Server to recognize that recording has completed via silence detection. If a message is recorded, meaning non-silence was detected, a NEWMSG response will be returned to the user. Otherwise, if only silence was detected, no message will have been created and an ERROR response will be returned to the Client detailing that only silence was detected. If any other problems occur on the Server side, an ERROR will be returned detailing the error message type.
Format: This command will contain no body fields.

Send Voice Message—Command

Mnemonic: MSGSND;
Purpose: Informs the Server to add the message id to each mailbox in the address list.
Valid Response: MSGXQT;
Error Response: ERROR;
Description: After a message has been recorded, the user may wish to finalize the transaction by sending a MSGSND command to the Server. This command informs the Server to apply the message id to each mailbox in the address list and to update any counters associated with the mailboxes. If all mailboxes are updated successfully, a MSGXQT response will be returned to the Client. Otherwise, an ERROR response will be returned detailing any error message types. If a mailbox(es) was not successfully updated for any reason, this data will be passed back to the user in the error message via the ERROR command. This information is not meant to be used as a recovery facility, but for informational use only.

Format: The command will have the following body fields.

| Field | Length | Description |
|---|---|---|
| mode | number 1 | Send Mode |
| | | Reply |
| | | Copy |
| | | Send |
| options | number 1 | Delivery Options |
| time | month, day, hour | Future Delivery (Optional) |

Play a Voice Message—Command

Mnemonic: MSGPLA;
Purpose: Informs the Server to play the current message id to the user over the voice channel.
Valid Responses: MSGPAU MSGRST MSGPND MSGLIS-REVPAU REVPND REVLIS;
Error Response: ERROR;
Description: When the user wants to listen to a voice message, a MSGPLA command will be sent to the Server. The Server will play either the current message id in the application state area or, if there is a message id in the MSGPLA command parameter, then this message will be placed in the application's current message area and played back to the user. While the message is playing, the user will be offered message navigational options. These options will allow the user to skip ahead, skip back, pause the message, skip to the end of the message, or skip the message and return to a main menu. Any of the MSGPAU, MSGRST, MSGPND, or MSGLIS responses are returned during message review flows. Any of the REVPAU, REVPND, or REVLIS commands are returned during send voice-mail flows. The ERROR response will be returned if a bad key is pressed while the message is being played over the voice channel.
Format: This command may have the following body fields. If the command parameter is empty, the Server will know to use the current message id.

| Field | Length | Description |
|---|---|---|
| mailbox | alpha 10 | message mailbox (req'd) |
| extension | number 2 | message extension |
| guest | number 1 | message guest |

The parameter information will be gathered from the message list returned to the Client from the host as a result of either the GETMSG or INTMSG Client commands.

Save Memo Data Message—Command

Mnemonic: MEMO;
Purpose: This command allows the user to update the memo field associated with a message. The memo field is a short description of the message.
Valid Response: MEMOOK;
Error Response: ERROR;
Description: The memo field can be created, modified, or deleted for any message reviewed or being sent. The memo information window would be made current and modified in some manner. To create a new memo for a message, simply type in a memo and <send> the memo.

To delete an existing memo, blank out the current memo and <send> the memo. To alter an existing memo, make the necessary modifications and <send> the memo. The memo must be sent to the Server in the form of a MEMO command in order for the Server to be aware of changes made on the Client end. If the memo is updated on the Server with no problems, a MEMOOK response will be returned to the Client. Otherwise, an ERROR response will be returned detailing the error message type.
Format: This command will have the following body fields.

| Field | Length | Description |
|---|---|---|
| mailbox | alpha 10 | msg mailbox (req'd) |
| extension | number 2 | msg extension (req'd) |
| guest | number 1 | msg guest (req'd) |
| queuests | number 2 | internal (req'd) |
| queuedt | number 5 | internal (req'd) |
| queuetim | number 8 | internal (req'd) |
| msgtran | number 12 | internal (req'd) |
| submsgtran | number 6 | internal (req'd) |
| memo data | alpha 40 | memo |
| memodte | alpha 5 | memo date |
| memotim | alpha 8 | memo time |

Erase the Selected Message—Command

Mnemonic: REVERS;
Purpose: This command informs the Server to change the status of the current message to erased/deleted.
Valid Response: REVERD;
Error Response: ERROR;
Description: The user has the option to erase/delete a message. If the user chooses this function a REVERS command is sent to the Server. If the Server performs the status change successfully, a REVERD response is sent back to the Client. Otherwise, if an error is encountered, an ERROR response will be returned detailing the error message type.
Format: The command will have the following body fields.

| Field | Length | Description |
|---|---|---|
| mailbox | alpha 10 | msg mailbox (req'd) |
| extension | number 2 | msg extension (req'd) |
| guest | number 1 | msg guest (req'd) |
| queuests | number 2 | internal (req'd) |
| queuedt | number 5 | internal (req'd) |
| queuetim | number 8 | internal (req'd) |
| msgtran | number 12 | internal (req'd) |
| submsgtran | number 6 | internal (req'd) |

This level of data is needed in case the message is erased/delete without listening to it first.

Save the Selected Message—Command

Mnemonic: SAVMSG;
Purpose: Informs the Server to change the status of a message to saved.
Valid Response: REVSVD;
Error Response: ERROR;
Description: The user has the option of changing the status of a message to saved. This can be done after the message is reviewed. In order to perform this function the Client will send a SAVMSG command to the Server who will perform the status change. If the status of the message is changed successfully, a REVSVD response is sent back to the Client. Otherwise, an ERROR response is returned detailing the error message type.

Format: This command will contain no body fields.

Finish Session—Command

Mnemonic: FINISH;
Purpose: Informs the Server that the Client environment is going inactive and the Server should perform destruct code for this user.
Valid Response: none;
Error Response: none;
Description: When the user decides to close the Universal Mailbox environment on the Client, a FINISH command will be sent to the Server. This informs the Server to perform destruct code for the users environment and to free up the user's data/voice ports. This command may also be initiated by the Client without any user interaction, e.g., where the user went to lunch and failed to close the environment.
Format: This command contains no body fields.

Error—Response

Mnemonic: ERROR;
Purpose: Indicates to the Client that an error occurred while the Server was processing the last command.
Valid Command: Any;
Description: An ERROR response is returned to the Client whenever the Server encounters a problem while processing a command. An error message will be returned in the body of the response detailing the error encountered.
Format: The response will have the following body fields.

| Field | Length | Description |
| --- | --- | --- |
| error sub-type | alpha 4 | error sub-indicator |
| message data | alpha 40 | message description |

Initialization Completed—Response

Mnemonic: INTOK;
Purpose: Indicates the Client/Server initialization has completed successfully.
Valid Commands: GETMSG INT INTOK ADDVER CREMSG;
Description: This response informs the Client that the Client/Server session was established. The Server returns to the Client the user's class of service data.
Format: The response will have the following data fields.

| Field | Length | Description |
| --- | --- | --- |
| COS data | alpha 10 | class of service data |

Messages Returned—Response

Mnemonic: MSGRET;
Purpose: Informs the Client that the Client/Server initialization completed successfully, returns the user's list of messages, and the user's class of service data.
Valid Commands: MEMO ADDVER MSGPLA INTMSG INT;
Description: This response informs the Client that the Client/Server session was established and initialization completed successfully. This response also returns the user list of message and class of service data.

Format: This response will have the following body fields.

| Field | Length | Description |
| --- | --- | --- |
| msgtype | alpha 2 | type of message |
| msgid | alpha 6 | message id |
| sender fname | alpha 25 | first name |
| sender lname | alpha 25 | last name |
| sender number | alpha 10 | sender's mailbox |
| date stamp | number 5 | date of message |
| time stamp | number 8 | time of message |
| msg length | number 6 | message length |
| disposition | number 1 | delivery information |
| memo | alpha 40 | memo message |
| memo date | alpha 5 | memo date |
| memo time | alpha 8 | memo time |
| queue status | number 2 | internal |
| message tran | number 12 | internal |
| submsgtran | number 6 | internal |
| COS data | alpha 10 | class of service |

Successful Address Verification—Response

Mnemonic: ADDOK;
Purpose: Informs the Client that all mailboxes in the address list are addressable by the user.
Valid Commands: ADDVER MEMO CREMSG;
Description: This response informs the Client that the address list sent to the Server is allowable for the user's mailbox. In other words, all mailboxes in the address list are addressable by the user.
Format: This response contains no body fields.

Address Verification Failed—Response

Mnemonic: ADDBAD;
Purpose: Informs the Client that one or more mailboxes in the address list failed verification.
Valid Commands: ADDVER CREMSG MEMO;
Description: This response informs the Client which mailboxes failed the address verification check. These mailboxes are not addressable by the Server and need to be modified or deleted by the user.
Format: This response will contain the following body fields.

| Field | Length | Description |
| --- | --- | --- |
| result field | alpha 2 | address result field |
| mailbox | alpha 10 | adressed mailbox |
| extension | number 2 | addressed extension |
| guest | number 1 | addressed quest |

Successful Memo Update—Response

Mnemonic: MEMOOK;
Purpose: This response indicates the memo update was successful.
Valid Commands: MEMO MSGSND MSGPLA;
Description: This response informs the Client that the memo create, delete, or modify was successful.
Format: This response will contain no body fields.

New Message Created—Response

Mnemonic: NEWMSG;
Purpose: This response indicates that a new message id was created.
Valid Commands: MSGSND MSGPLA;
Description: This response is returned to the Client when a message id is created through the user recording a voice message. A message id is created whenever non-silence is recorded.

Format: This response will contain no body fields.

Message Creation Completed—Response

Mnemonic: MSGXQT;
Purpose: This response is returned to the Client when the message creation process has been completed.
Valid Commands: Any;
Description: This response is returned to the Client when a message has been associated with a mailbox within the Server's database. This represents the final phase of message creation as the message will now be sent to its intended recipient.
Format: This response will contain no body fields.

Pause Message Listen—Response

Mnemonic: MSGPAU;
Purpose: Informs the Client that a message being listened to by the user has been paused.
Valid Commands: MSGPLA;
Description: This response is sent to the Client when the user has entered a DTMF 8 during message listen to pause the message currently being played.
Format: This response contains no body fields.

Cancel Message and Re-Record—Response

Mnemonic: MSGRST;
Purpose: This response indicates that a message was canceled and the user should re-record a new message.
Valid Commands: CREMSG;
Description: This response indicates that the user had recorded a message, was reviewing that message, and chose to erase the recorded message and re-record from the beginning.
Format: This response contains no body fields.

End Message Play during Send Voice—Response

Mnemonic: MSGPND;
Purpose: This response is returned when the user has chosen to stop listening to a message being played.
Valid Commands: MSGSND MSGPLA;
Description: This response indicates that the message being played to the user was discontinued by the user entering a DTMF #. The user heard part of the message and decided to discontinue the playing of the current message.
Format: This response contains no body fields.

Message Played to Completion During Send Voice—Response

Mnemonic: MSGLIS;
Purpose: This response indicates that the user listened to the entire message.
Valid Commands: CREMSG MSGSND;
Description: This response is returned to the Client when the user listened to the entire message and entered no DTMF digits to circumvent playing of the message.
Format: This response contains no body fields.

End Message Play during Message Review—Response

Mnemonic: REVPND;
Purpose: This response informs the Client that the user ended the reviewing of a message.
Valid Commands: MEMO MSGPLA;
Description: This response indicates that a message be played to the user during message review was discontinued.

Format: This response contains no body fields.

Message Paused during Message Review—Response

Mnemonic: REVPAU;
Purpose: This response informs the Client that a message was paused during message review.
Valid Commands: MSGPLA;
Description: This response indicates that the user entered a DTMF 8 while a message was being played to the user during message review.
Format: This response contains no body fields.

Message Play Completed during Message Review—Response

Mnemonic: REVLIS;
Purpose: This response informs the Client that the message was played to completion during message review.
Valid Commands: ADDVER MEMO MSGPLA CREMSG REVERS REVSVD;
Description: This response indicates that the user listened to either the entire message or entered a DTMF 99 which skips to the end of the message, during message review. The Client is informed that the user listened to the message and further action can be taken on this current message.
Format: This response contains no body fields.

Message Erased—Response

Mnemonic: REVERD;
Purpose: This response informs the Client that a message's status was changed to erased/deleted.
Valid Commands: MEMO MSGPLA;
Description: This response is sent back to the Client when a message's status field is changed to erased/deleted. This indicates that once the Client session ends, the message will no longer be available to the user from either the Client or the Server.
Format: This response contains no body fields.

Message Saved—Response

Mnemonic: REVSVD;
Purpose: This response informs the Client that a message's status was changed to save.
Valid Commands: MEMO MSGPLA;
Description: This response is sent back to the Client when a message's status field is changed to save. This indicates that the message will be retained across Client sessions.
Format: This response contains no body fields.

5. NAP EXTENSIONS

Further details of how to make the present invention are described next. This description focuses on NAP application interface extensions for data.

The following commands and responses can be added to the NAP API (i.e., the AIM Interface) to accommodate the extensions required to send and receive data between a Network Application (NA) and the NAP.

Receive Data Command (Message Type 46)

Purpose: To receive a data packet for the dialog.
Valid Response: Data Received (Message Type 126);
Execute Error (Error Code 137—No Data);
Return Digits: No;
Description: The Receive Data command instructs the NAP to return to the NA a data packet, if one is received within Timeout seconds on the data link corresponding to the network port associated with the dialog. The Timeout field in the command header (expressed in seconds) determines how long the dialog will be suspended, waiting for data. If the timeout is exceeded, an Execute Error response (error code 137—No Data) is returned to the NA. If data is available within the timeout period, a Data Received response is returned.

Format: The command will have the following body fields:
Field=Reserved; Length=350; Description=Spaces.

Send Data Command (Message Type 47)

Purpose: To send a data packet for the dialog.
Valid Response: Command Executed (Message Type 126); Execute Error (Error Code 138—Error Sending Data);
Return Digits: No;
Description: The Send Data command instructs the NAP to send a data packet on the data link corresponding to the network port associated with the dialog. If an error occurs wile sending data, for example, because no data link is configured for the network port, the NA will receive an Execute Error response (Error Code 138). If the data is successfully sent, a Command Executed response will be returned.

Format: The command will have the following body fields:

| Field | Length | Description |
|---|---|---|
| Length Segment | 4 | The length of data |
| Reserved | 96 | Must be spaces |
| Data | 250 | Application Defined |
| Data Continued | 2000 - (500 + SS) | Application Defined |

Data Received Response (Message Type 126)

Purpose: To return a data packet for the dialog.
Valid Commands: Any;
Return Digits: No;
Description: The data received response is a solicited response generated by the NAP in response to a Receive Data Command.

Format: The Data Received response will have the following body fields:

| Field | Length | Description |
|---|---|---|
| Length Segment | 4 | The length of data |
| Reserved | 96 | Must be spaces |
| Data | 150 | Application Defined |
| Data Continued | 2000 - (500 + SS) | Application Defined |

Data Present Flag

A new field (Data Present) is added to the response header. The field is length 1 at position 220. If the field contains "1", the AIM has been informed that data has been received for this dialog. The NA can retrieve the data by issuing a Receive Data command. It is not necessary for the NA to wait for this flag to be set before issuing a Receive Data command.

6. POSSIBLE MODIFICATIONS

A translation architecture part can be added to translate messages into the form or format the Client wants to see. In this manner, multiple Clients could be developed without having to follow a specific message format. The following is a brief description of a DataManager according to this embodiment.

The architecture of the DataManager is such that it utilizes libraries (Data Transport Services) to handle the protocol for the device type of the datacom line. A different library could be used for each type of physical device. The Data Transport Services (DTS) libraries can be defined and configured for specific datacom lines within NDM. Of course, the need for DTS may be eliminated by the use of appropriate NDL algorithms.

Once any datacom peculiarities of the device have been stripped off, raw data can be translated into a form more suitable for high-level application languages by an optional set of data translation routines (Application Translation Services). This translation is performed entirely at the behest of the NA, and enables a single NA to "talk" to different Client types using the same interface. The NA can choose to receive raw, untranslated data.

The AIM interface is, by design, very simple in that detailed data message formats are not defined at that level. This is to avoid constraining applications. The actual data layout is defined at a lower level, and is "agreed" between the NA and its Application Translation Services (ATS) library. A standard ATS can be used and applications can use the defined formats, or applications can supply their own ATS. The ATS can be defined and configured for a specific application within NDM.

We claim:
1. A voice and data messaging system, comprising:
   (a) a server comprising a first computer, a multi-applications platform (MAP) running on said first computer, and means for storing voice and data messages;
   (b) a client comprising a second computer with an associated display and means for transmitting analog voice messages and digital data messages to said server;
   (c) a client and server interface coupling said client to said server and providing a medium over which said client and server communicate, wherein the interface is a single telephone line;
   (d) universal mailbox means for (1) visually indicating to a user, via the display associated with the second computer, that voice and data messages have been delivered for said user and are being held by said server; and (2) permitting said user to review, erase, or forward, via said second computer and said single telephone line, a selected one of said voice and data messages stored by said server;
   wherein said universal mailbox means further includes means for performing a plurality of message functions including:
      (1) an initialization function wherein a client outdials the server; the server recognizes that the call is for a universal mailbox user; the server allocates a voice and data port; the server sends a DTMF identifying code; and the client receives the DTMF identifying code and initializes a client and server session, thereby permitting the user to perform message retrieval and message send functions;
      (2) erase selected message wherein the server performs a database function to change the status of a message to erased; and
      (3) save selected message, wherein the server performs a database function to change the status of a message to saved; and

(e) client interface means for allowing the user to select from some or all of said plurality of message functions, a message function to be performed.

2. A messaging system as recited in claim 1, wherein said universal mailbox means comprises application software running on said first computer.

3. A messaging system as recited in claim 1, wherein said universal mailbox means comprises application software running on said second computer.

4. A messaging system as recited in claim 1, further comprising an object database serving as a repository for stored voice, facsimile, and data messages exchanged between said client and server, said stored voice, facsimile, and data messages defining message objects.

5. A messaging system as recited in claim 4, further comprising a user database containing information concerning users along with references to message objects in said object database.

6. A messaging system as recited in claim 1, wherein said client and server interface comprises a public switched telephone network (PSTN).

7. A messaging system as recited in claim 1, wherein said client comprises a telephone for use in transmitting and receiving analog voice signals.

8. A messaging system as recited in claim 1, further comprising an object database serving as a repository for stored voice, facsimile, and data messages exchanged between said client and server, said stored voice, facsimile, and data messages defining message objects, and further comprising a user database containing information concerning users along with references to message objects in said object database; wherein said client and server interface comprises a public switched telephone network (PSTN); and wherein said client comprises a telephone for use in transmitting and receiving analog voice signals.

9. A messaging system as recited in claim 8, wherein said universal mailbox means comprises a server universal mailbox application and/or a client universal mailbox application.

10. A voice and data messaging system, comprising:
(a) a server comprising a first computer, a multi-applications platform (MAP) miming on said first computer, and means for storing voice and data messages;
(b) a client comprising a second computer with an associated display and means for transmitting analog voice messages and digital data messages to said server;
(c) a client and server interface coupling said client to said server and providing a medium over which said client and server communicate, wherein the interface is a single telephone line; and
(d) universal mailbox means for (1) visually indicating to a user, via the display associated with the second computer, that voice and data messages have been delivered for said user and are being held by said server; and (2) permitting said user to at least review, erase, or forward, via said second computer and said single telephone line, a selected one of said voice and dais messages stored by said server;
wherein said universal mailbox means further includes means for performing the following functions:
(1) initialization, wherein the client outdials the server; the server recognizes an incoming call and connects the call; the server recognizes that the call is for a universal mailbox user; the server allocates a voice and data port; the server sends a DTMF identifying code; the client receives the DTMF identifying code and initializes a client and server session, thereby permitting the user to perform message retrieval and message send functions;
(2) message summary, wherein the server gathers all messages associated with a user's mailbox;
(3) select and review selected message, wherein the server receivers a current message from the client for playback over a voice channel, wherein the user is given prescribed message review handling options while the current message is being played over the voice channel;
(4) update memo, wherein the server updates a memo field associated with a message, said memo field being placed in a database;
(5) create new message, wherein the user is enabled to create a new message; and
(6) send message, wherein a previously created message is sent to another user stationed at another client.

11. A messaging system as recited in claim 10, wherein said universal mailbox means further includes means for performing the following functions:
(7) erase selected message, wherein the server performs a database function to change the status of a message to erased; and
(8) save selected message, wherein the server performs a database function to change the status of a message to saved.

12. A server for use in a voice and data messaging system conforming to a client and server architecture, comprising:
(a) a first computer and a multi-applications platform (MAP) running on said first computer;
(b) database means operatively coupled to said first computer for storing voice, data and facsimile messages; and
(c) universal mailbox means for (1) visually indicating to a user, via a display device associated with a second, client computer operatively coupled to said server via a single telephone line, that voice and data messages have been delivered for said user and are being held by said database means; and (2) permitting said user to at least review, erase, or forward, via said second computer, a selected one of said voice and data messages stored by said server;
wherein said universal mailbox means further includes means for performing the following functions:
(1) initialization, wherein the server sends a DTMF identifying code to the client upon receiving an incoming call for a universal mailbox user; the server allocates a voice and data port; and the client initializes a client and server session upon receipt of the DTMF identifying code, thereby permitting the user to perform message retrieval and message send functions:
(2) message summary, wherein the server collects all messages associated with a user's mailbox;
(3) select and review selected message, wherein the server receives a current message from the client for playback over a voice channel, wherein the user is given prescribed message review handling options that are available while the current message is being played over the voice channel;
(4) update memo, wherein the server updates a memo field associated with a message, said memo field being placed in a data base;

(5) create new message, wherein the user is enabled to create a new message; and (6) send message, wherein a previously created message is sent to another user's mailbox.

13. A server as recited in claim 12, wherein said database means for storing voice and data messages comprises an object database, wherein the server stores in said object database stored voice, facsimile, and data messages exchanged between a client and the server, said stored voice, facsimile, and data messages defining message objects.

14. A server as recited in claim 13, further comprising a user database, wherein the server stores in said user database information concerning users along with references to message objects in said object database.

15. A server for use in a voice and data messaging system conforming to a client and server architecture, comprising:

(a) a first computer and a multi-applications platform (MAP) running on said first computer;

(b) means operatively coupled to said first computer for storing voice, data and facsimile messages;

(c) universal mailbox means for (1) visually indicating to a user, via a display device associated with a second, client computer operatively coupled to said server via a single telephone line, that voice and data messages have been delivered for said user and are being held by said server; and (2) permitting said user to at least review, erase, or forward, via said second computer and said single telephone line, a selected one of said voice and data messages stored by said server;

wherein said universal mailbox means further includes means for performing the following functions:

(1) initialization, wherein said client outdials the server; the server recognizes an incoming call and connects the call; the server recognizes that the call is for a universal mailbox user; the server allocates a voice and data port to the user; the server outdials the client and sends a DTMF identifying code; the client receives the DTMF identifying code and initializes a client and server session, thereby permitting the user to perform message retrieval and message send functions;

(2) message summary, wherein the server gathers all messages associated with a user's mailbox;

(3) select and review selected message, wherein the server receives a current message from the client for playback over a voice channel, wherein the user is given prescribed message review handling options while the message is being played over the voice channel;

(4) update memo, wherein the server updates a memo field associated with the message, said memo field being placed in a database;

(5) create new message, wherein a new message is created when a record option is selected by the user; and (6) send message, wherein a previously created message is sent to another user stretched at another client.

16. A server as recited in claim 15, wherein said universal mailbox means further includes means for performing the following functions:

(7) erase selected message, wherein the server performs a database function to change the status of a message to erased; and (8) save selected message, wherein the server performs a database function to change the status of a message to saved.

* * * * *